United States Patent
Yamamoto et al.

(10) Patent No.: US 12,167,407 B2
(45) Date of Patent: *Dec. 10, 2024

(54) BASE STATION, TERMINAL, AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,697

(22) Filed: Aug. 30, 2023

(65) Prior Publication Data

US 2023/0413273 A1  Dec. 21, 2023

Related U.S. Application Data

(63) Continuation of application No. 17/869,517, filed on Jul. 20, 2022, now Pat. No. 11,785,605, which is a
(Continued)

(30) Foreign Application Priority Data

Mar. 23, 2017 (JP) .................. 2017-057802
Nov. 17, 2017 (JP) .................. 2017-221981

(51) Int. Cl.
*H04W 72/21* (2023.01)
*H04L 5/00* (2006.01)
*H04W 72/044* (2023.01)

(52) U.S. Cl.
CPC ........... *H04W 72/21* (2023.01); *H04L 5/0055* (2013.01); *H04L 5/0057* (2013.01); *H04W 72/044* (2013.01)

(58) Field of Classification Search
CPC .............. H04W 72/21; H04W 72/044; H04W 72/23; H04W 72/0446; H04W 72/0453;
(Continued)

(56) References Cited

U.S. PATENT DOCUMENTS

2010/0029289 A1   2/2010  Love et al.
2012/0046032 A1   2/2012  Baldemair et al.
(Continued)

FOREIGN PATENT DOCUMENTS

WO   WO 2011016252 A1   2/2011
WO   WO 2018085044 A1   5/2018

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 13)," 3GPP TS 36.212 V13.4.0, Dec. 2016, 140 pages.
(Continued)

*Primary Examiner* — Ayaz R Sheikh
*Assistant Examiner* — Tarell A Hampton
(74) *Attorney, Agent, or Firm* — Seed IP Law Group LLP

(57) ABSTRACT

At a base station, a control unit selects one combination from multiple combinations of parameters regarding uplink control channel (PUCCH) resources. A transmission unit indicates a terminal of resource settings (Semi-static resource configuration) including the multiple combinations by higher layer signaling, and indicates the terminal of the one combination that has been selected by dynamic signaling (DCI).

13 Claims, 25 Drawing Sheets

| DCI field | PDSCH mapping Type A | PDSCH mapping type B |
|---|---|---|
| Slot position | X bits | |
| PUCCH resource | Y bits | X + Y bits |

Related U.S. Application Data continuation of application No. 16/488,251, filed as application No. PCT/JP2018/002725 on Jan. 29, 2018, now Pat. No. 11,432,268.

(58) Field of Classification Search
CPC .......... H04W 72/0466; H04W 72/232; H04L 5/0055; H04L 5/0057; H04L 5/0091; H04L 5/0094; H04L 5/0016; H04L 5/0012; H04L 5/0053; H04B 1/69
See application file for complete search history.

(56) References Cited

U.S. PATENT DOCUMENTS

| | | | |
|---|---|---|---|
| 2012/0115526 | A1 | 5/2012 | Ogawa et al. |
| 2015/0334637 | A1 | 11/2015 | Kim et al. |
| 2018/0097609 | A1 | 4/2018 | Tiirola et al. |
| 2018/0124815 | A1 | 5/2018 | Papasakellariou |
| 2018/0167933 | A1 | 6/2018 | Yin et al. |
| 2018/0220415 | A1 | 8/2018 | Yin et al. |
| 2019/0098622 | A1 | 3/2019 | Lee et al. |
| 2019/0261397 | A1* | 8/2019 | Takeda .................. H04L 5/0094 |
| 2019/0289586 | A1 | 9/2019 | Ouchi et al. |
| 2020/0077424 | A1 | 3/2020 | Baldemair et al. |
| 2020/0153672 | A1 | 5/2020 | Choi et al. |
| 2020/0236700 | A1 | 7/2020 | Matsumura et al. |
| 2020/0351863 | A1 | 11/2020 | Matsumura et al. |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)," 3GPP TS 36.211 V13.4.0, Dec. 2016, 171 pages.

3GPP, "3rd Generation Partnership Project; Technical Specification Group Radio Access Network; Evolved Universal Terrestrial Radio Access (E-UTRA); Physical layer procedures (Release 13)," 3GPP TS 36.213 V13.4.0, Dec. 2016, 386 pages.

3GPP, "3rd Generation Partnership Project; Technical Specification Group Radio Access Network; Evolved Universal Terrestrial Radio Access (E-UTRA); Physical layer procedures (Release 14)," 3GPP TS 36.213 V14.1.0, Dec. 2016. (414 pages).

3GPP, "3rd Generation Partnership Project; Technical Specification Group Radio Access Network; NR; Physical layer procedures for control (Release 15)," 3GPP TS 38.213 V1.2.0, Nov. 2017. (38 pages).

CATT, "NR UL control channel structure," R1-1611394, Agenda Item: 7.1.4.2, 3GPP TSG RAN WG1 #87, Reno, USA, Nov. 14-18, 2016, 4 pages.

CATT, "PUCCH Resource Allocation," R1-1702099, Agenda Item: 8.1.3.2.3, 3GPP TSG RAN WG1 Meeting #88, Athens, Greece, Feb. 13-17, 2017. (3 pages).

Ericsson, "On Long PUCH," R1-1703294, Agenda Item: 8.1.3.2.2, 3GPP TSG RAN WG1 Meeting #88, Athens, Greece, Feb. 13-17, 2017, 3 pages.

Ericsson, "On PUCCH resource allocation," R1-1703296, Agenda Item: 8.1.3.2.3, 3GPP TSG RAN WG1 Meeting #88, Athens, Greece, Feb. 13-17, 2017, 3 pages.

Ericsson, Huawei, "TP for TR 36.878: Uplink characteristics in Unidirectional RRH arrangement," R4-158130, Agenda item: 9.5.1, 3GPP TSG-RAN WG4 Meeting #77, Anaheim, CA, US, Nov. 16-20, 2015, 6 pages.

Extended European Search Report, dated Feb. 13, 2020, for European Patent Application No. 18772565.0-1205, 8 pages.

Extended European Search Report, dated Mar. 7, 2022, for European Patent Application No. 21209020.3-1205, 11 pages.

Guangdong OPPO Mobile Telecom, "On duration aspects of NR PUCCH with long duration," R1-1701956, Agenda Item: 8.1.3.2.2, 3GPP TSG RAN WG1 meeting #88, Athens, Greece, Feb. 13-17, 2017, 6 pages.

Huawei, HiSilicon, "Control signaling enhancements for short TTI," R1-156461, Agenda Item: 6.2.9.2, 3GPP TSG RAN WG1 Meeting #83, Anaheim, USA, Nov. 15-22, 2015, 7 pages.

Huawei, HiSilicon, "Resource indication of UL control channel," R1-1701648, Agenda Item: 8.1.3.2.3, 3GPP TSG RAN WG1 Meeting #88, Athens, Greece, Feb. 13-17, 2017, 4 pages.

Intel Corporation, "Scheduling request design for NR," R1-1700370, Agenda item: 5.1.3.2, 3GPP TSG RAN WG1 NR Ad-Hock Meeting, Spokane, USA, Jan. 16-20, 2017, 4 pages.

International Search Report, mailed Apr. 17, 2018, for International Application No. PCT/JP2018/002725, 4 pages. (with English translation).

LG Electronics, NTT DOCOMO, ETRI, "WF on PUCCH resource allocation," R1-1703927, Agenda Item: 8.1.3.2.3 3GPP TSG RAN WG1 Meeting #88, Athens, Greece, Feb. 13-17, 2017, 3 pages.

LG Electronics, NTT DOCOMO, ETRI, CATT, "WF on PUCCH resource allocation," R1-1704043, Agenda Item: 8.1.3.2.3, 3GPP TSG RAN WG1 Meeting #88, Athens, Greece, Feb. 13-17, 2017, 3 pages.

MCC Support, "Final Report of 3GPP TSG RAN WG1 #AH1_NR v1.0.0," R1-1701553, 3GPP TSG RAN WG1 Meeting #88, Athens, Greece, Feb. 13-17, 2017, 106 pages.

Motorola, "PUCCH options to address UL/DL co-existence," R4-082561, Agenda Item: 6.1.2.2, 3GPP TSG RAN WG4 (Radio) Meeting #48bis, Edinburgh, Scotland, Sep. 29-Oct. 3, 2008, 6 pages.

Panasonic, "Discussion on resource allocation for uplink control channel," R1-1702301, Agenda Item: 8.1.3.2.3, 3GPP TSG RAN WG1 Meeting #88, Athens, Greece, Feb. 13-17, 2017, 2 pages.

ZTE, et al., "NR PUCCH in long duration," R1-1701589, Agenda Item: 8.1.3.2.2, 3GPP TSG RAN WG1 Meeting #88, Athens, Greece, Feb. 13-17, 2017. (5 pages).

ZTE, et al., "NR PUCCH resource allocation," R1-1701591, Agenda Item: 8.1.3.2.3, 3GPP TSG RAN WG1 Meeting #88, Athens, Greece, Feb. 13-17, 2017. (9 pages).

ZTE, et al., "NR PUCCH structure in short duration," R1-1701590, Agenda Item: 8.1.3.2.1, 3GPP TSG RAN WG1 Meeting #88, Athens, Greece, Feb. 13-17, 2017. (5 pages).

* cited by examiner

FIG. 2

| | | | | | | | | | | | | |
|---|---|---|---|---|---|---|---|---|---|---|---|---|
| PRB#3 | n36 | n37 | n38 | n39 | n40 | n41 | n42 | n43 | n44 | n45 | n46 | n47 |
| PRB#2 | n24 | n25 | n26 | n27 | n28 | n29 | n30 | n31 | n32 | n33 | n34 | n35 |
| PRB#1 | n12 | n13 | n14 | n15 | n16 | n17 | n18 | n19 | n20 | n21 | n22 | n23 |
| PRB#0 | n0 | n1 | n2 | n3 | n4 | n5 | n6 | n7 | n8 | n9 | n10 | n11 |
| | CS#0 | #1 | #2 | #3 | #4 | #5 | #6 | #7 | #8 | #9 | #10 | #11 |

Frequency domain ↑

Code domain →

| DCI bit | X | A | B | C |
|---|---|---|---|---|
| 0 | X(0) | A(0) | B(0) | C(0) |
| 1 | X(1) | A(1) | B(1) | C(1) |
| 2 | X(2) | A(2) | B(2) | C(2) |
| ⋮ | ⋮ | ⋮ | ⋮ | ⋮ |
| M | X($N_x$) | A($N_A$) | B($N_B$) | C($N_C$) |

FIG. 12

| Configuration X | $N_{offset}$ | $M_{PRB}$ | $N_{cluster}$ | D |
|---|---|---|---|---|
| X(0) | 0 | 4 | 1 | 0 |
| X(1) | 4 | 4 | 1 | 0 |
| X(2) | 8 | 4 | 1 | 0 |
| X(3) | 12 | 4 | 1 | 0 |
| X(4) | 16 | 4 | 1 | 0 |
| X(5) | 20 | 4 | 1 | 0 |
| X(6) | 24 | 4 | 1 | 0 |
| X(7) | 28 | 4 | 1 | 0 |

FIG. 13

| Configuration X | $N_{offset}$ | $M_{PRB}$ | $N_{cluster}$ | D |
|---|---|---|---|---|
| X(0) | 0 | 2 | 2 | 14 |
| X(1) | 2 | 2 | 2 | 14 |
| X(2) | 4 | 2 | 2 | 14 |
| X(3) | 6 | 2 | 2 | 14 |
| X(4) | 8 | 2 | 2 | 14 |
| X(5) | 10 | 2 | 2 | 14 |
| X(6) | 12 | 2 | 2 | 14 |
| X(7) | 14 | 2 | 2 | 14 |

FIG. 22

| DCI field | PDSCH mapping Type A | PDSCH mapping type B |
|---|---|---|
| Slot position | X bits | |
| PUCCH resource | Y bits | X + Y bits |

FIG. 23

| DCI field | PDSCH mapping Type A | PDSCH mapping type B |
|---|---|---|
| Slot position | X bits | |
| PUCCH resource | Y bits | Y bits |

| DCI bit | X | A | B | C |
|---|---|---|---|---|
| 0 | X(0) | A(0) | All available UL symbols | All available UL symbols |
| 1 | X(1) | A(1) | All available UL symbols | All available UL symbols |
| 2 | X(2) | A(2) | All available UL symbols | All available UL symbols |
| ⋮ | ⋮ | ⋮ | ⋮ | ⋮ |
| M | X($N_X$) | A($N_A$) | All available UL symbols | All available UL symbols |

BASE STATION, TERMINAL, AND COMMUNICATION METHOD

TECHNICAL FIELD

The present disclosure relates to a base station, a terminal, and a communication method.

BACKGROUND ART

As services using mobile broadband have come into widespread use in recent years, the data traffic in mobile communication has continuously seen exponential growth, and expanding data transmission capacity is imperative for the future. Also, dramatic development is anticipated for the IoT (Internet of Things), where all "things" are connected via the Internet in the future. In order to support diversity in services by the IoT, dramatic sophistication is demanded for various requisites such as low-delay and communication area (coverage), not just data transmission capacity. In light of this background, technological development and standardization of 5th generation mobile communication systems (5G) that will have marked improvement in capabilities and functions as compared with the 4th generation mobile communication systems (4G: 4th Generation mobile communication systems) is being advanced.

In 5G standardization, the 3GPP (3rd Generation Partnership Project) is advancing technological development of a new wireless access technology (NR: New Radio), that does not necessarily have backward-compatibility with LTE (Long Term Evolution)-Advanced.

An arrangement is being studied for NR, where, in the same way as with LTE, a terminal (UE: User Equipment) uses an uplink control channel (PUCCH: Physical Uplink Control Channel) to transmit response signals indicating downlink data error detection results (ACK/NACK: Acknowledgement/Negative Acknowledgment), downlink channel state information (CSI: Channel State Information), and uplink wireless resource allocation request (SR: Scheduling Request), to a base station (eNB or gNB).

PUCCH resources in LTE as standardized by the 3GPP include frequency domain and code domain resources (e.g., see NPL 1 through 3). Specifically, PUCCH resources in LTE are defined by resource blocks (RB: Resource Block) (may also be referred to as PRB: Physical RB) within the system band, and spread code (CS: Cyclic Shift or orthogonal code). PUCCH resources in LTE are made up of one PRB of frequency domain, and one subframe (14 symbols) of time domain.

CITATION LIST

Non Patent Literature

NPL 1: 3GPP TS 36.211 V 13.4.0, "Evolved Universal Terrestrial Radio Access (E-UTRA); Physical channels and modulation (Release 13)," December 2016.
NPL 2: 3GPP TS 36.213 V 13.4.0, "Evolved Universal Terrestrial Radio Access (E-UTRA); Physical layer procedures (Release 13)," December 2016.
NPL 3: 3GPP TS 36.211 V 13.4.0, "Evolved Universal Terrestrial Radio Access (E-UTRA); Physical channels and modulation (Release 13)," December 2016.
NPL 4: R1-1701553, "Final minutes from RAN1 #AH1_NR (Spokane's meeting)," ETSI, MCC, February 2017.
NPL 5: R1-1704043, "WF on PUCCH resource allocation," LG Electronics, NTT DOCOMO, ETRI, CATT, February 2017.

SUMMARY OF INVENTION

As described above, PUCCH resources in LTE are configured of one PRB and one subframe, with information that the base station should indicate the terminal of for allocation of PUCCH resources being frequency resources (PRB index) and spreading code index (CS index or orthogonal code index). However, NR handles requirements and transmission/reception capabilities of diverse services, so PUCCH design with higher flexibility than in LTE is necessary.

One embodiment of the present disclosure facilitates providing of a base station, terminal, and communication method where PUCCH resources can be flexibly allocated.

A base station according to an embodiment of the present disclosure includes: a circuit that selects, from a plurality of combinations of parameters regarding uplink control channel (PUCCH) resources, one combination; and a transmitter that indicates a terminal of resource settings corresponding to the plurality of combinations by higher layer signaling, and indicates the terminal of the one combination that has been selected by dynamic signaling.

A terminal, according to an embodiment of the present disclosure includes: a receiver that receives higher layer signaling including resource settings corresponding to a plurality of combinations of parameters regarding uplink control channel (PUCCH) resources, and receives dynamic signaling indicating one combination out of the plurality of combinations; and a transmitter that transmits uplink control signals by the PUCCH resources represented by the plurality of parameters corresponding to the one combination indicated by the dynamic signaling, out of the plurality of combinations.

A communication method according to an embodiment of the present disclosure includes: selecting, from a plurality of combinations of parameters regarding uplink control channel (PUCCH) resources, one combination; and indicating a terminal of resource settings including the plurality of combinations by higher layer signaling, and indicating the terminal of the one combination that has been selected by dynamic signaling.

A communication method according to an embodiment of the present disclosure includes: receiving higher layer signaling including resource settings including a plurality of combinations of parameters regarding uplink control channel (PUCCH) resources, and receiving dynamic signaling indicating one combination out of the plurality of combinations; and transmitting uplink control signals by the PUCCH resources represented by the plurality of parameters corresponding to the one combination indicated by the dynamic signaling, out of the plurality of combinations.

It should be noted that these general or specific embodiments may be implemented as a system, a method, an integrated circuit, a computer program, or a recording medium, and may be realized by any combination of a system, device, method, integrated circuit, computer program, and recording medium.

According to one embodiment of the present disclosure, PUCCH resources can be flexibly allocated.

Additional benefits and advantages of the disclosed embodiments will become apparent from the specification and drawings. The benefits and/or advantages may be individually obtained by the various embodiments and features

BRIEF DESCRIPTION OF DRAWINGS

FIG. 2 illustrates an example of PUCCH resources in LTE.

FIG. 10 illustrates an example of correlation between DCI bits and Semi-static resource configuration according to the first embodiment.

FIG. 12 illustrates an example of a notification method of a parameter X at the time of Localized transmission in the first modification of the first embodiment.

FIG. 13 illustrates an example of a notification method of a parameter X at the time of Distributed transmission in the first modification of the first embodiment.

FIG. 22 illustrates an example of a notification method of PUCCH resources according to a fourth embodiment.

FIG. 23 illustrates an example of a notification method of PUCCH resources according to a modification of the fourth embodiment.

DESCRIPTION OF EMBODIMENTS

Embodiments of the present disclosure will be described in detail below with reference to the drawings.

A terminal transmitting uplink control signals such as ACK/NACK signals (response signals), CSI, SR, and so forth, to the base station using PUCCH in the same way as in LTE, is being studied in NR, as described above.

Figure 1:
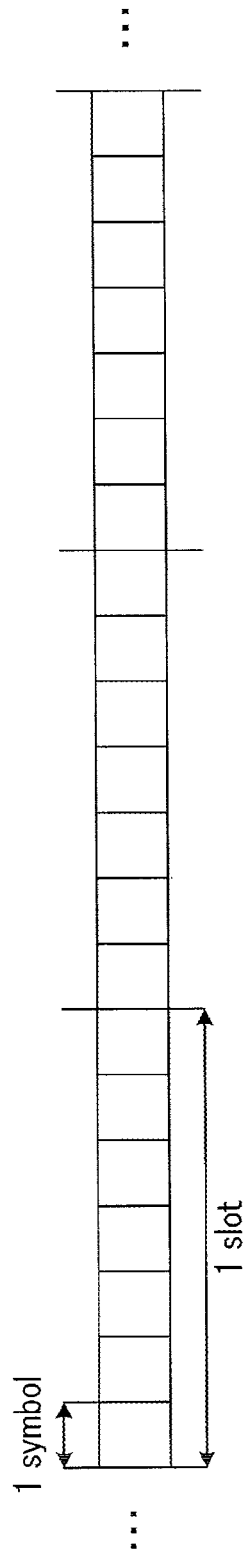
FIG. 1 illustrates a configuration example of an NR slot.

In doing so, the terminal needs to identify PUCCH resources used for transmission of uplink control signals. A method is being studied in NR where, with regard to allocation PUCCH resources for transmitting ACK/NACK signals in downlink data, a terminal is indicated of a set of semi-static (Semi-static) PUCCH resources by higher layer signals, and the terminal selects PUCCH resources to actually be used by downlink control signals (DCI: Downlink Control Information) (e.g., see NPLs 4 and 5). Now, PUCCH resources in NR include the resources of time domain, and frequency domain or code domain. Time domain resources include slots and symbols within slots. FIG. 1 is a configuration example of slots (also referred to as "NR slot") in NR. An NR slot is configured of seven symbols or 14 symbols.

Next, PUCCH resources allocation in LTE standardized by the 3GPP will be described (e.g., see NPLs 1 through 3). In LTE, there are frequency domain and code domain resources for PUCCH resources. Specifically, PUCCH resources are defined by resource blocks (PRB) and spreading code (CS) in the system band, as illustrated in FIG. 2.

In LTE, PUCCH resources (PRB and spreading code) for transmitting ACK/NACK signals regarding downlink data are implicitly decided from downlink control channel (PDCCH: Physical Downlink Control Channel) resources with corresponding downlink data allocated. For example, in the example in FIG. 2, in a case where a PUCCH resource corresponding to a PDCCH resource is n14, a PRB with RB index #1 and spreading code of CS index #2 are allocated.

Also, in the FDD (Frequency Division Duplex) system in LTE, ACK/NACK signals for downlink data are transmitted using PUCCH resources in an object subframe four subframes after the subframe where the downlink data was transmitted. Also, in the TDD (Time Division Duplex) system in LTE, ACK/NACK signals for downlink data are transmitted using PUCCH resources in an object subframe four or more subframes after the subframe where the downlink data was transmitted.

That is to say, in LTE, time domain resources for transmission of PUCCH (uplink subframes) are correlated with subframes where downlink data was transmitted, and fixed.

Accordingly, there has been no need for indication of time domain resources for transmission of PUCCH to the terminal in LTE. On the other hand, there is need to indicate the terminal of the time domain resource (slot index, etc.) for transmission of PUCCH in NR, in order to flexibly change the time domain resources (slot position) in accordance with requirements of services and processing capabilities of the terminal when transmitting PUCCH to the terminal.

As described earlier, the PUCCH resources are configured of one PRB in the frequency domain and one subframe in the time domain in LTE. Accordingly, if the subframe where PUCCH is transmitted is identified, there has been no need in LTE to make indication of other information (e.g., symbol information) regarding the time domain resources for transmission of PUCCH. On the other hand, flexibly changing the transmission time of PUCCH in accordance with service requirements or processing capabilities of the terminal is being studied in NR, such as PUCCH transmission of one or two symbols, or PUCCH transmission of three or more symbols (e.g., four or more symbols), and so forth. Accordingly, with regard to time domain resources for transmission of PUCCH, there is a need to indicate the terminal of information relating to symbols transmitting PUCCH in one slot in NR. The terminal also has to be indicated of the PUCCH transmission period length (symbol length, etc.) in NR.

Frequency domain resources for PUCCH transmission in LTE are configured of one PRB in LTE, so there has been the need to indicate the terminal of the position of this one PRB. On the other hand, PUCCH transmission using multiple PRBs is being studied in NR. Accordingly, there is a need to indicate the terminal of more resource allocation information as compared to LTE with regard to frequency domain resource for PUCCH transmission as well in NR.

Thus, there is an increase of parameters necessary for indication of PUCCH resource allocation in NR as compared to LTE, with regard to both time domain resources and frequency domain resources.

As described above, a method is being studied regarding allocation of PUCCH resources for transmission of ACK/NACK signals for downlink data in NR, where the base station makes indication of a set of semi-static PUCCH resources by higher layer signals, and PUCCH resources to actually be used by DCI are selected.

However, there is an increase in parameters necessary for indication of allocation of PUCCH resources in NR as compared to LTE, as described above. Accordingly, in a case of indicating the terminal of values that each of the parameters of the PUCCH resources can assume by higher layer signals, and selecting values of PUCCH resources to actually be used by DCI, the number of parameters to be indicated by DCI increases, and the DCI overhead increases.

On the other hand, in LTE, PUCCH resources for transmitting CSI or SRs are semi-statically and explicitly indicated by higher layer signals. A method is also employed in LTE where, with regard to PUCCH resource allocation for transmission of ACK/NACK signals indicating error detection results of downlink data using SPS (Semi-persistent scheduling) or the like, the base station semi-statically indicates the terminal of multiple PUCCH resources (e.g., four PUCCH resources) by higher layer signals, and one PUCCH resource to be actually used is selected out of the multiple PUCCH resources, using two bits of the downlink control signals (DCI) of the PDCCH to which corresponding downlink data has been allocated.

However, in a case of semi-statically indicating the terminal of multiple PUCCH resources by higher layer signals, and selecting one PUCCH resource to be actually used by several bits of the DCI of the PDCCH to which the corresponding downlink data has been allocated, as in the indication method of SPS resource allocation in LTE, the number of DCI bits can be reduced, but flexible resource allocation cannot be realized.

Also, in a case of extending the method in LTE for NR, the PUCCH resource (slot position, symbol position, RB index, etc.,) can be identified, but PUCCH transmission length and resource mapping of the frequency domain have not been taken into consideration.

Accordingly, description will be made below regarding a method where PUCCH resources can be appropriately allocated in NR while preventing increased DCI overhead.

In PUCCH resources allocation in NR, all combinations of time domain resources and frequency domain resources do not have to be taken into consideration. For example, the number of symbols in a slot that can be used as PUCCH resources are dependent on the type of slot (Downlink centric slot, Uplink centric slot, Downlink only slot, Uplink only slot, and so forth) in NR, as illustrated in FIG. 3.

Figure 3:
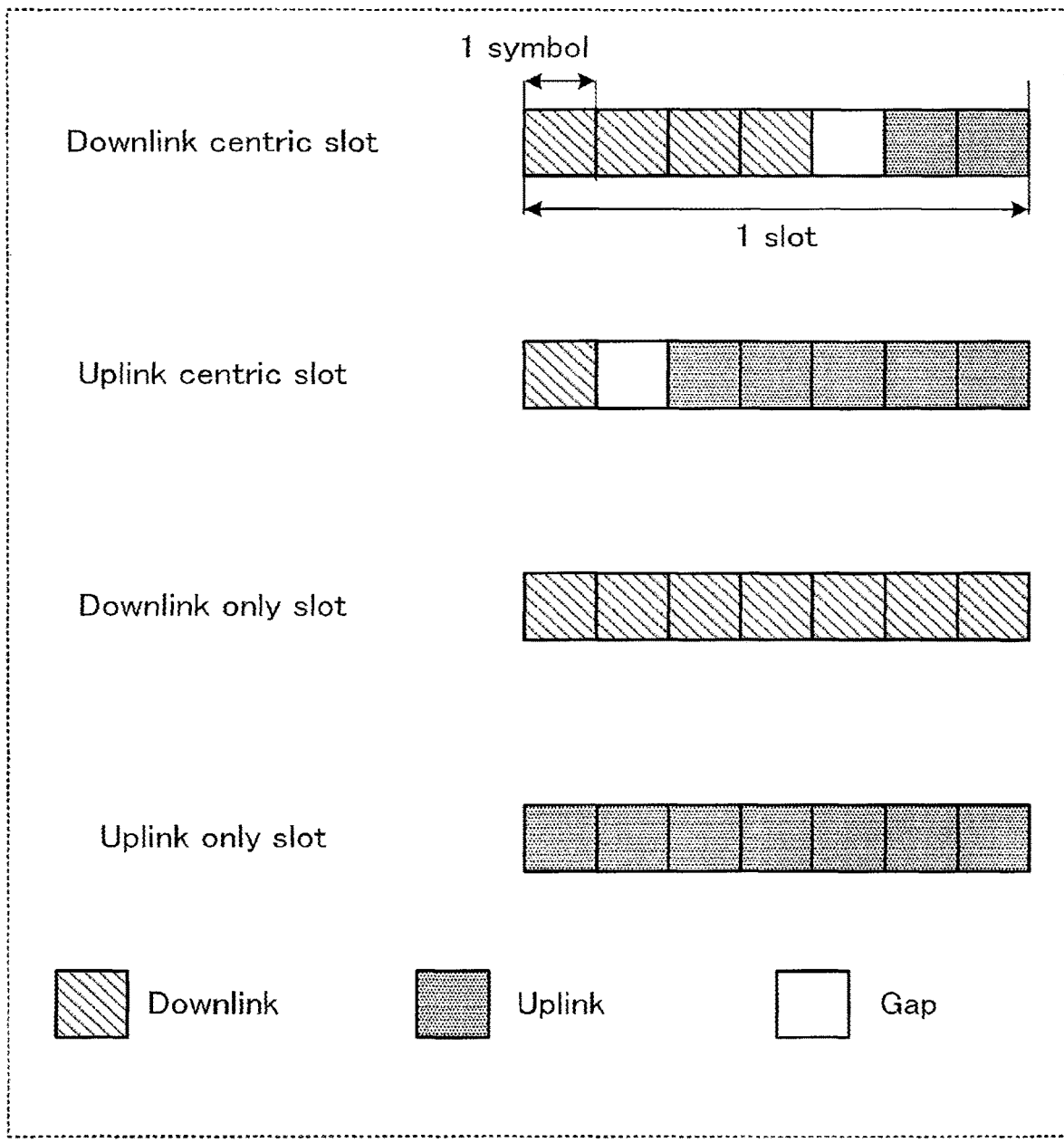
FIG. 3 illustrates types of slots.

For example, in the example in FIG. 3, the number of symbols in a slot that can be used as PUCCH resources (UL symbols) are a maximum of two symbols in the case of Downlink centric slot, a maximum of five symbols in the case of Uplink centric slot, zero symbols in the case of Downlink only slot, and a maximum of seven symbols in the case of Uplink only slot. Thus, the number of symbols within the slot are dependent on the type of slot, so not all combinations of parameters relating to slots and parameters relating to symbols have to be taken into consideration as PUCCH resources.

Figure 4:
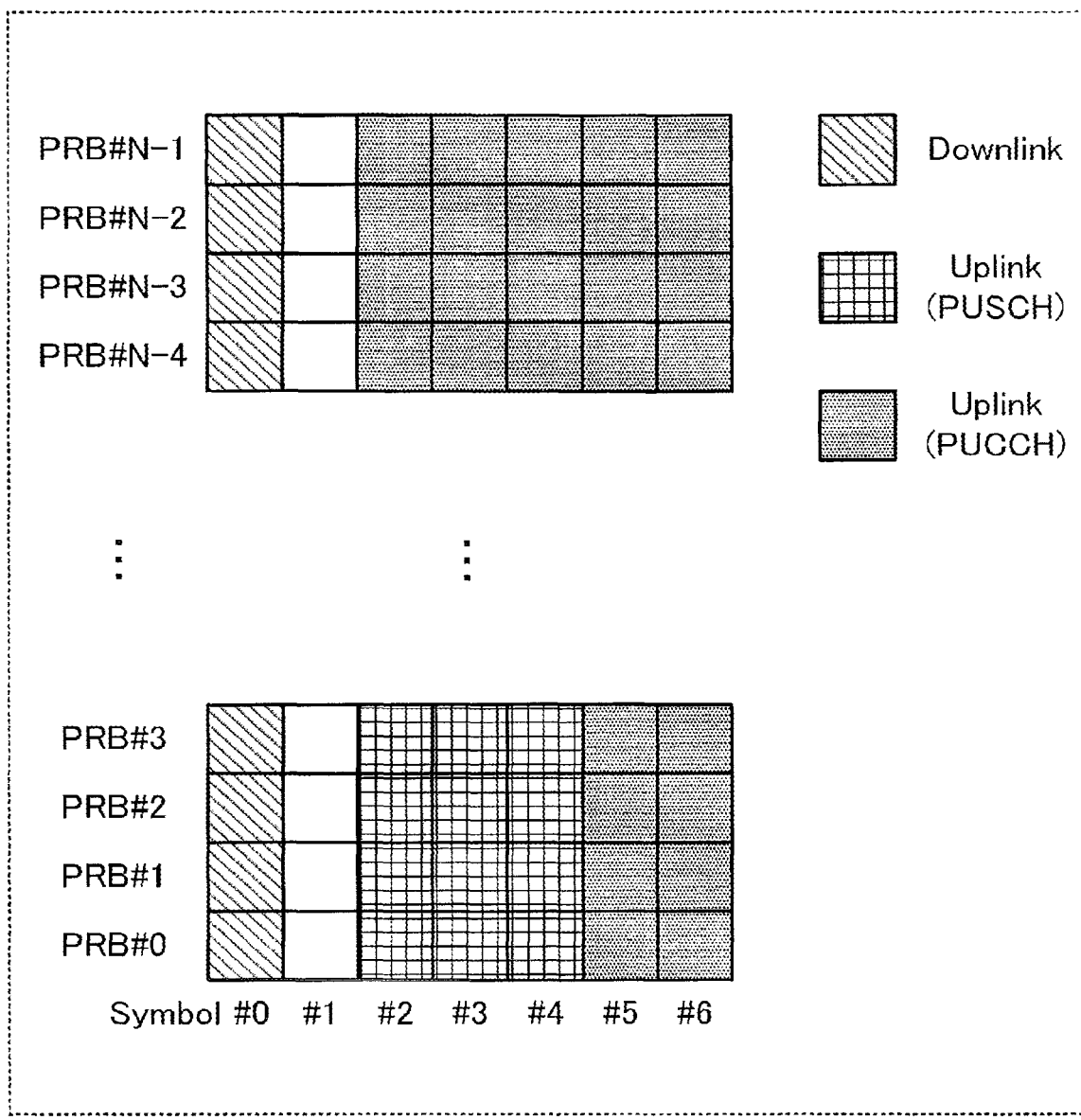
FIG. 4 illustrates an example of PUCCH resources within a band.

Also, it is also conceivable that the number of symbols within a slot that can be used as PUCCH resources is dependent on frequency resources (PRB) within the system band or a band allocable to a terminal, as illustrated in FIG. 4.

For example, in the example in FIG. 4, at the PRBs of RB index #0 through #3, two symbols (symbol #5 and #6) are usable as PUCCH resources, and at the PRBs of RB index #N−4 through #N−1, five symbols (symbol #2 through #6) are usable as PUCCH resources. Thus, the number of symbols within the slot differ depending on the frequency band, so there is no need to take into consideration all combinations of parameters relating to frequency resources (RB indices.) and parameters relating to symbols as PUCCH resources.

Further, the PUCCH transmission length (number of symbols) is dependent on symbol positions within the slot. For example, a PUCCH transmitted using two symbols will never be combined with symbol #6 (e.g., the last symbol in the slot). Also, for a PUCCH transmitted using four symbols, for example, combination with Downlink centric slot (two UL symbols) and Downlink only slot (zero UL symbols) illustrated in FIG. 3, or the RB indices. #0 through #3 (two UL symbols) illustrated in FIG. 4 does not have to be taken into consideration.

Thus, there is no need in NR to take into consideration all combinations of time domain resources and frequency domain resources in allocation of PUCCH resources.

Accordingly, in one embodiment of the present disclosure, with regard to allocation of PUCCH resources for transmission of uplink control signals (e.g., ACK/NACK signals), the base station makes indication to the terminal of resource settings including combinations of multiple parameters relating to PUCCH resources (defined as "Semi-static resource configuration") using higher layer signals, and one combination of parameters regarding the PUCCH resource to be actually used is selected using several bits of the DCI of the PDCCH to which corresponding downlink data has been allocated.

At this time, an example of parameters (Semi-static resource configuration) relating to PUCCH resources that the base station indicates the terminal of by higher layer signals includes information relating to usage of frequency domain resources (hereinafter expressed as $X(0)$, $X(1), \ldots, X(N_X-1)$), information relating to time domain resources (specifically, slots) (hereinafter expressed as $A(0)$, $A(1), \ldots, A(N_A-1)$), information relating to time domain resources (specifically, symbol positions within slots) (hereinafter expressed as $B(0)$, $B(1), \ldots, B(N_B-1)$), and information related to PUCCH transmission period (hereinafter expressed as $C(0)$, $C(1), \ldots, C(N_C-1)$). Note that parameters related to PUCCH resources are not restricted to this information.

Differences in PUCCH resources used by the terminal are generated by combinations of the parameters (X, A, B, and C) in the Semi-static resource configuration that the base station indicates the terminal of by higher layer signals.

Thus, multiple parameter combinations relating to PUCCH resources are indicated to the terminal from the base station by higher layer signals, and the combination actually used is indicated by DCI, so increase in DCI overhead can be prevented as compared to a case of the multiple parameters themselves to be actually used being indicated by DCI. Also, combinations that can be set as PUCCH resources are indicated by higher layer signals, rather than all combinations of multiple parameters relating to PUCCH resources, and the combination to be actually used is indicated by DCI, whereby flexible allocation of PUCCH resources can be realized.

Embodiments will be described below in detail.

As one example of granularity (unit) of PUCCH resources, the frequency domain will be described hereinafter in increments of PRBs and the time domain in unit of symbols. That is to say, assumption is made that PUCCHs among different terminals are subjected to FDM in PRB domain, and TDM in units of symbols. Note that the granularity (unit) of PUCCH resources is not restricted to this.

First Embodiment

[Overview of Communication System]

A communication system according embodiments of the present disclosure have a base station 100 and a terminal 200.

Figure 5:
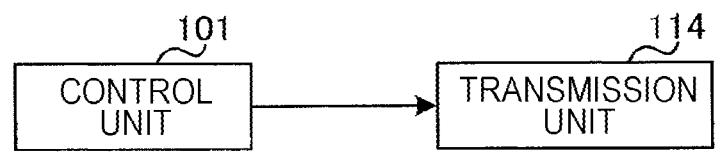
FIG. 5 illustrates the configuration of a base station according to a first embodiment.

FIG. 5 is a block diagram illustrating the configuration of the base station 100 according to the embodiments of the present disclosure. In the base station 100 illustrated in FIG. 5, a control unit 101 selects one combination from multiple combinations of parameters relating to uplink control channel (PUCCH) resources. A transmission unit 114 indicates the terminal 200 of resource settings (Semi-static resource configuration) that the multiple combinations indicate by higher layer signaling, and indicates the terminal 200 of the one combination that has been selected, by dynamic signaling (DCI).

Figure 6:
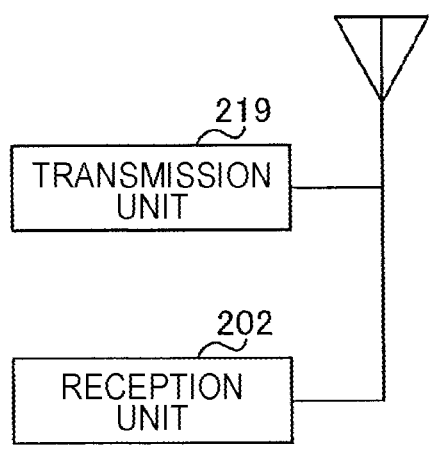
FIG. 6 illustrates the configuration of a terminal according to the first embodiment.

FIG. 6 is a block diagram illustrating the configuration of the terminal 200 according to the embodiments of the present disclosure. In the terminal 200 illustrated in FIG. 6, a reception unit 202 receives higher layer signaling including resource settings (Semi-static resource configuration) indicating multiple parameter combinations relating to uplink control channel (PUCCH) resources, and receives dynamic signaling (DCI) indicating one combination of the multiple combinations. A transmission unit 219 transmits uplink control signals by PUCCH resources represented by multiple parameters corresponding to the one combination out of the multiple combinations that is indicated by dynamic signaling.

[Configuration of Base Station]

Figure 7:
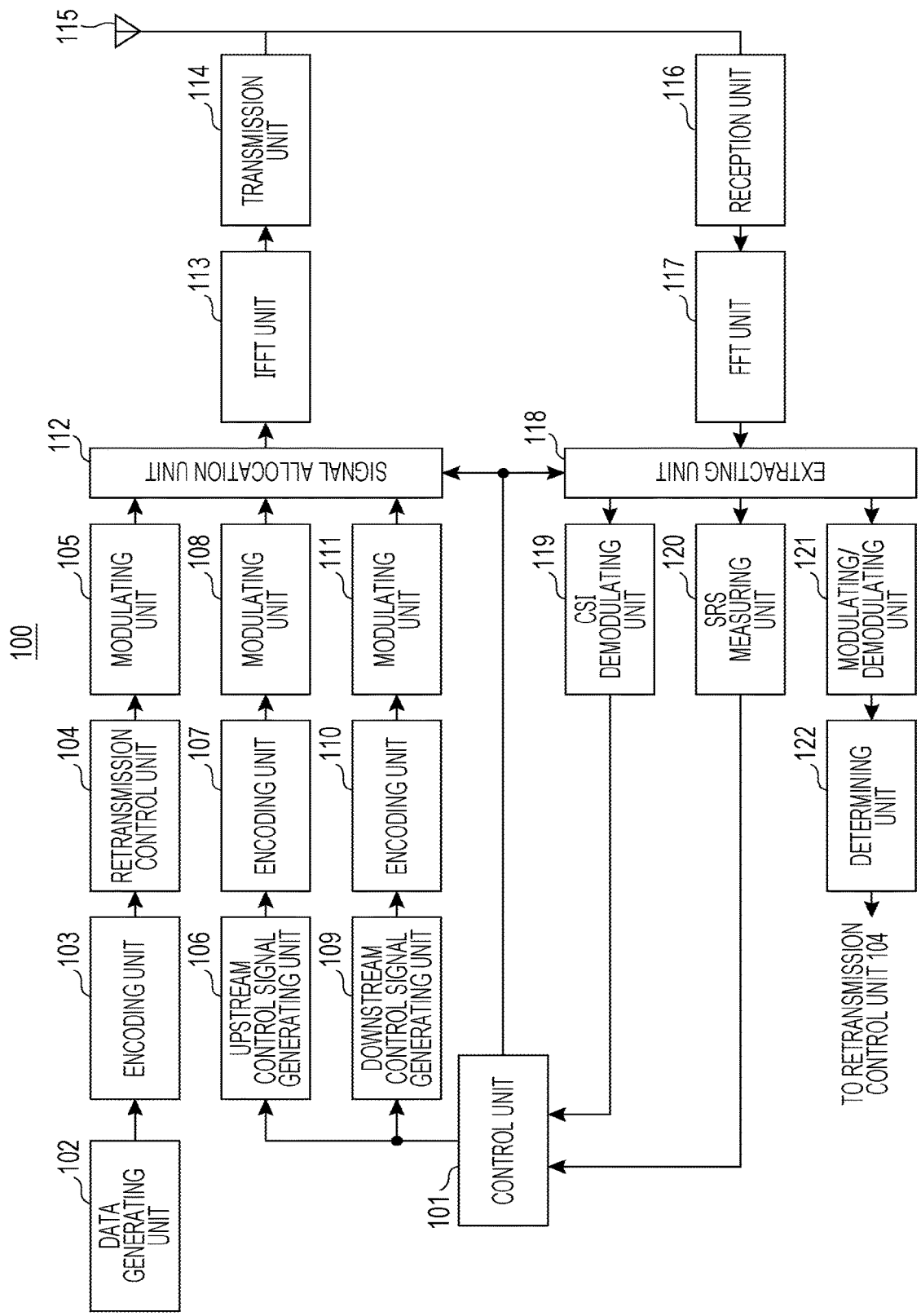
FIG. 7 illustrates the configuration of the base station according to the first embodiment.

FIG. 7 is a block diagram illustrating the configuration of the base station 100 according to a first embodiment of the present disclosure. In FIG. 7, the base station 100 includes the control unit 101, a data generating unit 102, an encoding unit 103, a retransmission control unit 104, a modulating unit 105, an higher layer control signal generating unit 106, an encoding unit 107, a modulating unit 108, a downlink control signal generating unit 109, an encoding unit 110, a modulating unit 111, a signal allocation unit 112, an IFFT (Inverse Fast Fourier Transform) unit 113, a transmission unit 114, an antenna 115, a reception unit 116, an FFT (Fast Fourier Transform) unit 117, an extracting unit 118, a CSI demodulating unit 119, an SRS (Sounding Reference Signal) measuring unit 120, a modulating/demodulating unit 121, and a determining unit 122.

The control unit 101 determines the "Semi-static resource configuration" including the multiple parameter combinations regarding uplink resources to be indicated to the terminal 200 by higher layer signals. The uplink resources here are, for example, PUCCH resources for transmitting ACK/NACK signals, PUCCH resources for transmitting periodic CSI signals, PUCCH resources for transmitting SRs, PUCCH resources for transmitting aperiodic CSI signals, resources for transmitting periodic and aperiodic SRS signals, and so forth. The control unit 101 outputs the information that has been decided to the higher layer control signal generating unit 106.

The control unit 101 decides an uplink resource to be actually allocated to the terminal 200 (i.e., a combination of parameters to be indicated by DCI), out of the Semi-static resource configuration indicated to the terminal 200 by higher layer signals. For example, the control unit 101 decides information relating to actual resources for indication by DCI from each of PUCCH resources configuration for transmitting ACK/NACK signals, resource configuration for transmitting Aperiodic CSI signals, and resource configuration for transmitting Aperiodic SRS, that are included in the Semi-static resource configuration. The control unit 101 outputs the decided information to the downlink control signal generating unit 109. The control unit 101 also outputs the decided information to the extracting unit 118, to correctly receive signals from the terminal 200.

The control unit 101 also decides wireless resource allocation regarding downlink data to the terminal 200, and outputs downward resource allocation information indicating resource allocation for downlink data to the downlink control signal generating unit 109 and signal allocation unit 112.

The data generating unit 102 generates downlink data for the terminal 200, and outputs to the encoding unit 103.

The encoding unit 103 performs error correction encoding processing on the downlink data input from the data generating unit 102, and outputs the encoded data signals to the retransmission control unit 104.

At the time of initial transmission, the retransmission control unit 104 stores the encoded data signals input from the encoding unit 103, and also outputs to the modulating unit 105. Upon a NACK being input from the later-described determining unit 122 in response to the transmitted data signals, the retransmission control unit 104 outputs the corresponding data that is stored to the modulating unit 105. On the other hand, upon an ACK being input from the determining unit 122 in response to the transmitted data signals, the retransmission control unit 104 deletes the corresponding data that is stored.

The modulating unit 105 modulates the data signals input from the retransmission control unit 104, and outputs the data modulation signals to the signal allocation unit 112.

The higher layer control signal generating unit 106 uses the information input from the control unit 101 (e.g., Semistatic resource configuration) to generate a control information bit string, and outputs the generated control information bit string to the encoding unit 107.

The encoding unit 107 performs error correction encoding on the control information bit string input from the higher layer control signal generating unit 106, and outputs the encoded control signals to the modulating unit 108.

The modulating unit 108 modulates the control signals input from the encoding unit 107, and outputs the modulated control signals to the signal allocation unit 112.

The downlink control signal generating unit 109 generates a control information bit string (DCI) using information input from the control unit 101 (information relating to the uplink resource that the terminal 200 will actually use, and downlink resource allocation information), and outputs the generated control information bit string to the encoding unit 110. Note that there are cases where control information is transmitted to multiple terminals, so the downlink control signal generating unit 109 may generate a bit string including the terminal ID of each terminal in the control information for the terminals.

The downlink control signal generating unit 109 may also generate a group common control information bit string address to the multiple terminals, using information instructing slot type or resource amount (number of symbols, etc.) usable for uplink.

The encoding unit 110 performs error correction encoding on the control information bit string input from the downlink control signal generating unit 109, and outputs the encoded control signals to the modulating unit 111.

The modulating unit 111 modulates the control signals input from the encoding unit 110 and outputs the modulated control signals to the signal allocation unit 112.

The signal allocation unit 112 maps the data signals input from the modulating unit 105 to wireless resources, based on downward resource allocation information input from the control unit 101. The signal allocation unit 112 also maps control signals input from the modulating unit 108 or modulating unit 111 to wireless resources. The signal allocation unit 112 outputs the downlink signals where signals have been mapped to the IFFT unit 113.

The IFFT unit 113 subjects the signals input from the signal allocation unit 112 to transmission waveform generating processing such as OFDM (Orthogonal Frequency Division Multiplexing) or the like. In a case of OFDM transmission where a CP (Cyclic Prefix) is attached, the IFFT unit 113 attaches the CP (omitted from illustration). The IFFT unit 113 outputs the generated transmission waveforms to the transmission unit 114.

The transmission unit 114 performs RF (Radio Frequency) processing such as D/A (Digital-to-Analog) conversion, upconverting, and so forth, on the signals input from the IFFT unit 113, and transmits the wireless signals to the terminal 200 via the antenna 115.

The reception unit 116 performs RF processing such as downconverting or A/D (Analog-to-Digital) conversion and the like on uplink signal waveforms from the terminal 200 received via the antenna 115, and outputs the uplink signal waveforms after reception processing to the FFT unit 117.

The FFT unit 117 subjects the uplink signal waveforms input from the reception unit 116 to FFT processing for conversion of time domain signals into frequency domain signals. The FFT unit 117 outputs the frequency domain signals obtained by FFT processing to the extracting unit 118.

The extracting unit 118 extracts wireless resources where CSI feedback signals, SRS, or ACK/NACK signals have been transmitted, from the signals input from the FFT unit 117, based on information received from the control unit 101 (information relating to uplink resources actually allocated at the terminal 200), and outputs the components of the wireless resources that have been extracted (CSI feedback signals, SRS, or ACK/NACK signals) to the CSI demodulating unit 119, SRS measuring unit 120, or modulating/demodulating unit 121, respectively.

The CSI demodulating unit 119 demodulates the CSI feedback signals input from the extracting unit 118, and outputs the demodulated information to the control unit 101. The CSI feedback is used by the control unit 101 for downlink allocation control, for example.

The SRS measuring unit 120 uses SRS signals input from the extracting unit 118 to measure the uplink channel quality, and outputs measurement information to the control unit 101. The information of the measurement is used at the control unit 101 for uplink allocation control (omitted from illustration), for example.

The modulating/demodulating unit 121 performs demodulation and error correction decoding on the signals input from the extracting unit 118, and outputs a decoded bit string to the determining unit 122.

The determining unit 122 determines which of ACK and NACK that the ACK/NACK signal transmitted from the terminal 200 indicates with regard to the transmitted data signals, based on the bit string input from the modulating/demodulating unit 121. The determining unit 122 outputs the results of the determination to the retransmission control unit 104.

[Configuration of Terminal]

Figure 8:
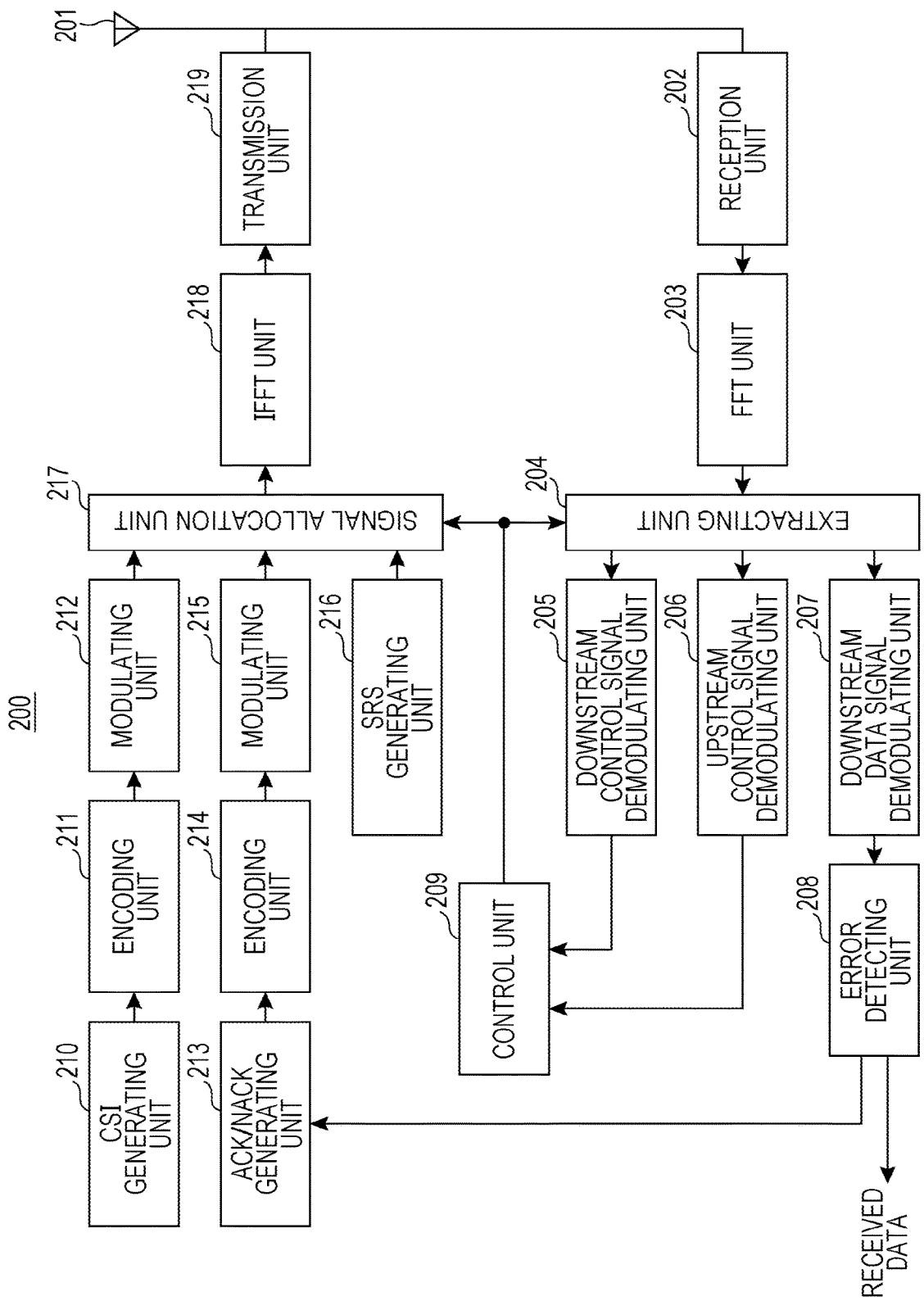
FIG. 8 illustrates the configuration of the terminal according to the first embodiment.

FIG. 8 is a block diagram illustrating the configuration of the terminal 200 according to the first embodiment of the present disclosure. In FIG. 8, the terminal 200 includes an antenna 201, the reception unit 202, an FFT unit 203, an extracting unit 204, a downlink control signal demodulating unit 205, an higher layer control signal demodulating unit 206, a downlink data signal demodulating unit 207, an error detecting unit 208, a control unit 209, a CSI generating unit 210, an encoding unit 211, a modulating unit 212, an ACK/NACK generating unit 213, an encoding unit 214, a modulating unit 215, an SRS generating unit 216, a signal allocation unit 217, an IFFT unit 218, and the transmission unit 219.

The reception unit 202 subjects signal waveforms of downlink signals (data signals and control signals) received from the base station 100 via the antenna 201 to RF processing such as downconversion and A/D (Analog-to-Digital) conversion, and outputs the obtained reception signals (baseband signals) to the FFT unit 203.

The FFT unit 203 subjects the signals (dime domain signals) input from the reception unit 202 to FFT processing, where time domain signals are converted into frequency domain signals. The FFT unit 203 outputs the frequency domain signals obtained by the FFT processing to the extracting unit 204.

The extracting unit 204 extracts downlink control signals (DCI) from signals input from the FFT unit 203, based on control information input from the control unit 209, and outputs to the downlink control signal demodulating unit 205. The extracting unit 204 also extracts higher layer control signals and downlink data signals based on control information input from the control unit 209, outputs higher layer control signals to the higher layer control signal demodulating unit 206, and outputs downlink data signals to the downlink data signal demodulating unit 207.

The downlink control signal demodulating unit 205 performs blind decoding of the downlink control signals input from the extracting unit 204, and in a case of judging that these are control signals addressed to itself, demodulates these control signals and outputs to the control unit 209.

The higher layer control signal demodulating unit 206 demodulates the higher layer control signals input from the extracting unit 204, and outputs the demodulated higher layer control signals to the control unit 209.

The downlink data signal demodulating unit 207 demodulates and decodes downlink data signals input from the extracting unit 204, and outputs decoded downlink data to the error detecting unit 208.

The error detecting unit 208 performs error detection on the downlink data input from the downlink data signal demodulating unit 207, and outputs error detection results to the ACK/NACK generating unit 213. The error detecting unit 208 also outputs downlink data that has been determined to be without error as reception data as a result of error detection.

The control unit 209 calculates wireless resource allocation for the downlink data signals based on downlink resource allocation information indicated in control signals input from the downlink control signal demodulating unit 205, and outputs information indicating the calculated wireless resource allocation to the extracting unit 204.

The control unit 209 also uses higher layer control signals (Semi-static resource configuration) input from the higher layer control signal demodulating unit 206 and control signals (information relating to uplink resources to be actually used by the terminal 200) input from the downlink control signal demodulating unit 205 to set the uplink resources (PUCCH resources for transmitting ACK/NACK signals, PUCCH resources for transmitting Periodic CSI signals, PUCCH resources for transmitting SRs, resources for transmitting Aperiodic CSI signals, and resources for transmitting Periodic and Aperiodic SRS) that the terminal 200 is to use by a method which will be described later. The control unit 209 then outputs the information regarding uplink resources that has been set to the signal allocation unit 217.

The CSI generating unit 210 uses measurement results (omitted from illustration) of downlink channel quality measured at the terminal 200 to generate a CSI feedback bit string, and outputs the CSI feedback bit string to the encoding unit 211.

The encoding unit 211 performs error correction encoding on the CSI feedback bit string input from the CSI generating unit 210, and outputs the encoded CSI signals to the modulating unit 212.

The modulating unit 212 modulates the CSI signals input from the encoding unit 211, and outputs the modulated CSI signals to the signal allocation unit 217.

The ACK/NACK generating unit 213 generates ACK/NACK signals (ACK or NACK) as to the received downlink data, based on the error detection results input from the error detecting unit 208. The ACK/NACK generating unit 213 outputs the generated ACK/NACK signals (bit series) to the encoding unit 214.

The encoding unit 214 performs error correction encoding to the bit series input from the ACK/NACK generating unit 213, and outputs the encoded bit series (ACK/NACK signals) to the modulating unit 215.

The modulating unit 215 modulates the ACK/NACK signals input from the encoding unit 214 and outputs the modulated ACK/NACK signals to the signal allocation unit 217.

The SRS generating unit 216 generates an SRS series and outputs to the signal allocation unit 217.

The signal allocation unit 217 maps each of the CSI signals input from the modulating unit 212, ACK/NACK signals input from the modulating unit 215, and SRS series input from the SRS generating unit 216, to wireless resources instructed by the control unit 209. The signal allocation unit 217 outputs uplink signals where the signals have been mapped to the IFFT unit 218.

The IFFT unit 218 subjects the signals input from the signal allocation unit 217 to transmission wave generation processing such as OFDM or the like. In a case of OFDM transmission where a CP (Cyclic Prefix) is attached, the IFFT unit 218 attaches the CP (omitted from illustration). Alternatively, in a case where the IFFT unit 218 generates single-carrier waveforms, a DFT (Discrete Fourier Transform) unit may be added (omitted from illustration) upstream of the signal allocation unit 217. The IFFT unit 218 outputs the generated transmission waveforms to the transmission unit 219.

The transmission unit 219 performs RF (Radio Frequency) processing such as D/A (Digital-to-Analog) conversion, upconverting, and so forth, on the signals input from the IFFT unit 218, and transmits the wireless signals to the base station 100 via the antenna 201.

[Operations of the Base Station 100 and Terminal 200]

Operations at the base station 100 and terminal 200 having the above configurations will be described below in detail.

Figure 9:
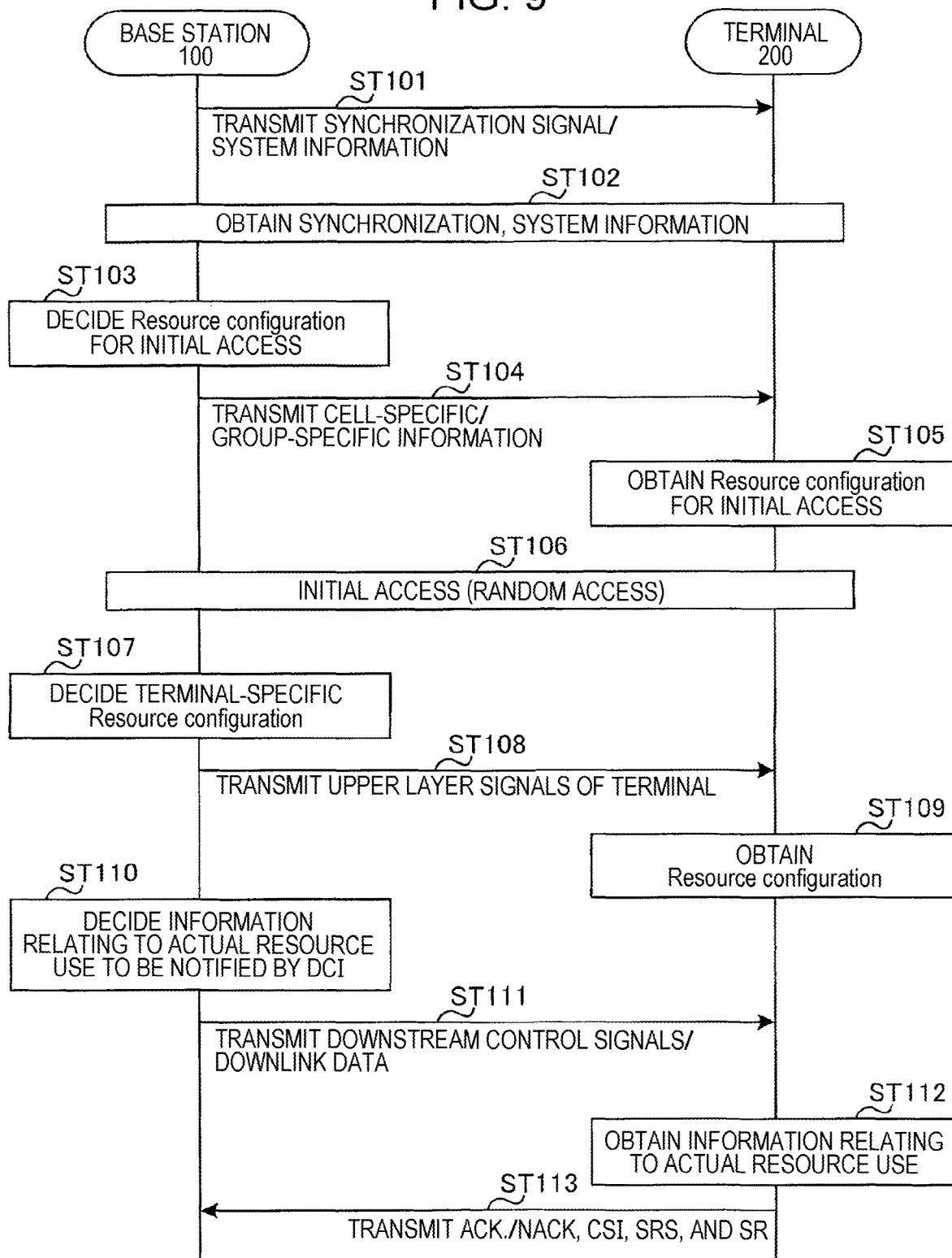
FIG. 9 illustrates processing between the base station and terminal according to the first embodiment.

FIG. 9 illustrates the flow of processing at the base station 100 and terminal 200 according to the present embodiment.

The base station 100 indicates the terminal 200 of a synchronization signal (PSS (Primary Synchronization Signal)/SSS (Secondary Synchronization Signal)) or system information (MIB (Master Information Block)/SIB (System Information Block)) (ST101). The terminal 200 obtains the synchronization signal or system information (ST102).

Next, the base station 100 decides resource initial-access settings (Semi-static resource configuration) for the terminal 200 (ST103), and transmits the Semi-static resource configuration that has been decided to the terminal as cell-specific information or group-specific information (ST104). The terminal 200 obtains the Semi-static resource configuration transmitted from the base station 100 (ST105).

The terminal 200 then executes initial access (random access) procedures (or RRC connection control) or the like with the base station 100 (ST106).

Next, the base station 100 decides resource settings (Semi-static resource configuration) specific for the terminal 200 (ST107).

For example, the parameters making up the Semi-static resource configuration for PUCCH include the following information.

X: information relating to using frequency domain resources

A: information relating to time domain resources (e.g., slot)

B: information relating to time domain resources (e.g., position of symbol within slot)

C: information relating to PUCCH transmission period

An example of the information X relating to use of frequency domain resources is a parameter indicating the PRB used for PUCCH transmission.

An example of information A relating to time domain resources (e.g., slot) is a parameter relating to the number of slots in PDCCH reception where corresponding downlink data has been allocated.

An example of information B relating to time domain resources (e.g., position of symbol within slot) is a parameter indicating the symbol index (information indicating what symbol index from the end (or the start) is to be started from) within a slot for starting PUCCH transmission.

An example of information C relating to PUCCH transmission period is a parameter indicating the number of symbols used for PUCCH transmission.

That is to say, frequency domain resources (PRB) and time domain resources (slot and symbol) for PUCCH are identified by the combination of the parameters X, A, B, and C. Note that the parameters X, A, B, and C are not restricted to the above example.

The base station 100 sets the multiple parameters X, A, B, and C making up the above-described Semi-static resource configuration for PUCCH, and combinations of parameters X, A, B, and C, as illustrated in FIG. 10, for example. In FIG. 10, the base station 100 sets (M+1) combinations ($M=N_X=N_A=N_B=N_C$) regarding the parameters X, A, B, and C.

The base station 100 then transmits the decided resource settings (Semi-static resource configuration) specific to the terminal 200, to the terminal 200, by higher layer signals (higher layer signaling) (ST108).

For example, the base station 100 indicates the terminal 200 of information relating to usage of frequency domain resources ($X(0), X(1), \ldots, X(N_X)$), information relating to time domain resources (slots) ($A(0), A(1), \ldots, A(N_A)$), information relating to time domain resources (symbol positions within slots) ($B(0), B(1), \ldots, B(N_B)$), and information regarding PUCCH transmission period ($C(0), C(1), \ldots, C(N_C)$), by higher layer signals, as Semi-static resource configuration for PUCCH indicating (M+1) combinations (combinations corresponding to DCI bits which will be described later) illustrated in FIG. 10.

The base station 100 indicates the terminal 200 of the association between the Semi-static resource configuration and DCI bits (e.g., see FIG. 10) by higher layer signals.

The terminal 200 obtains resource settings included in the higher layer signals (ST109). Accordingly, the terminal 200 identifies multiple (M+1) combinations that can be set as frequency domain resources and time domain resources for PUCCH, by obtaining the Semi-static resource configuration for PUCCH by the higher layer signals from the base station 100.

Next, the base station 100 decides information relating to uplink resources or downlink resources to be actually allocated to the terminal 200 (uplink resource information to be notified by DCI) (ST110). At this time, the base station 100 selects one combination of parameters to be actually used with regard to the terminal 200, out of the Semi-static resource configuration (combination of parameters relating to uplink resources) that the terminal 200 was indicated of by higher layer signals in ST108.

The base station 100 then transmits the decided uplink resource information (the one combination that has been selected), downlink resource allocation information of downlink data, and this downlink data, to the terminal 200 (ST111). That is to say, the base station 100 indicates the terminal 200 of the one combination corresponding to the resources to be actually used out of (M+1) combinations of parameters X, A, B, and C illustrated in FIG. 10, by DCI bits of the PDCCH to which the corresponding downlink data is allocated (dynamic signaling).

The terminal 200 obtains uplink resource information (the combination of parameters selected at the base station 100) (ST112).

The terminal 200 then performs CRC (Cyclic Redundancy Check) on the downlink data, for example, and feeds back to the base station 100 an ACK if there is no error in the CRC computation results, or a NACK if there is error in the CRC computation results, as ACK/NACK signals (ST113). At this time, the terminal 200 identifies resources for the PUCCH to be used for feedback of ACK/NACK signals, using one combination (X, A, B, C) indicated by DCI bits, out of the correlation (see FIG. 10) between Semi-static resource configuration for the PUCCH indicated by higher layer signals and DCI bits.

Note that the terminal 200 can transmit the other uplink signals (CSI, SRS, SR) using the resources identified by one combination (X, A, B, C) indicated by DCI bits, out of the association (see FIG. 10) between Semi-static resource configuration and DCI bits, in the same way as ACK/NACK signals. At this time, the association between Semi-static resource configuration and DCI bits may differ among the signals (ACK/NACK signals, CSI, SRS, and SR).

Thus, according to the present embodiment, when indicating the terminal 200 of PUCCH resource allocation information, the base station 100 makes indication of Semi-static resource configuration including multiple parameter (X, A, B, C) combinations relating to PUCCH resources using higher layer signaling, and makes indication of one combination to be actually used for allocation to the terminal 200 by DCI. That is to say, indication of PUCCH allocation is performed using higher layer signaling and DCI in conjunction.

The terminal 200 then transmits the uplink control signals (ACK/NACK signals CSI, SRS, and SR) by PUCCH resources represented by the multiple parameters corresponding to the one combination indicated by DCI, out of the Semi-static resource configuration indicated by higher layer signaling.

Accordingly, it is sufficient for the base station 100 to make indication of one combination (bit information) by DCI at the time of PUCCH allocation, and the need to make indication of PUCCH resources to be actually used (information X, A, B, and C relating to frequency domain resources and time domain resources) each time PUCCH allocation is performed, so increase in the DCI size can be suppressed.

Also, the base station 100 can make indication of PUCCH resources made up of multiple combinations of frequency domain resources and time domain resources as a Semi-static resource configuration by higher layer, and by using DCI can dynamically change the combination that the terminal 200 will actually use out of the multiple combinations of PUCCH resources, so PUCCH resources can be flexibly allocated.

Thus, according to the present embodiment, PUCCH resources can be flexibly allocated while preventing increase in DCI overhead.

First Modification of First Embodiment

A indication method of information X regarding use of frequency domain resources will be described.

As one indication method of information (X(0), X(1), . . . , X($N_X$)) regarding use of frequency domain resources, a method by bitmap is conceivable. A method using bitmap enables flexible resource allocation to be realized, but overhead for indicating the information X regarding use of frequency domain resources by higher layer signals increases. For example, in a case where the number of PRBs corresponding to the bandwidth is $N_{RB}$, $N_{RB}$ bits are necessary for indicating the information X regarding use of frequency domain resources by bitmap.

With regard to PUCCH resources mapping, supporting Localized transmission and Distributed transmission is begin studied in NR.

In this case, information X regarding use of frequency domain resources can be expressed using the four parameters of start position (offset value) starting from the edge of the band (system band or band allocable to the terminal 200) ($N_{offset}$), number of consecutive PRBs ($M_{PRB}$), number of clusters ($N_{cluster}$), and inter-cluster distance (D).

Figure 11:
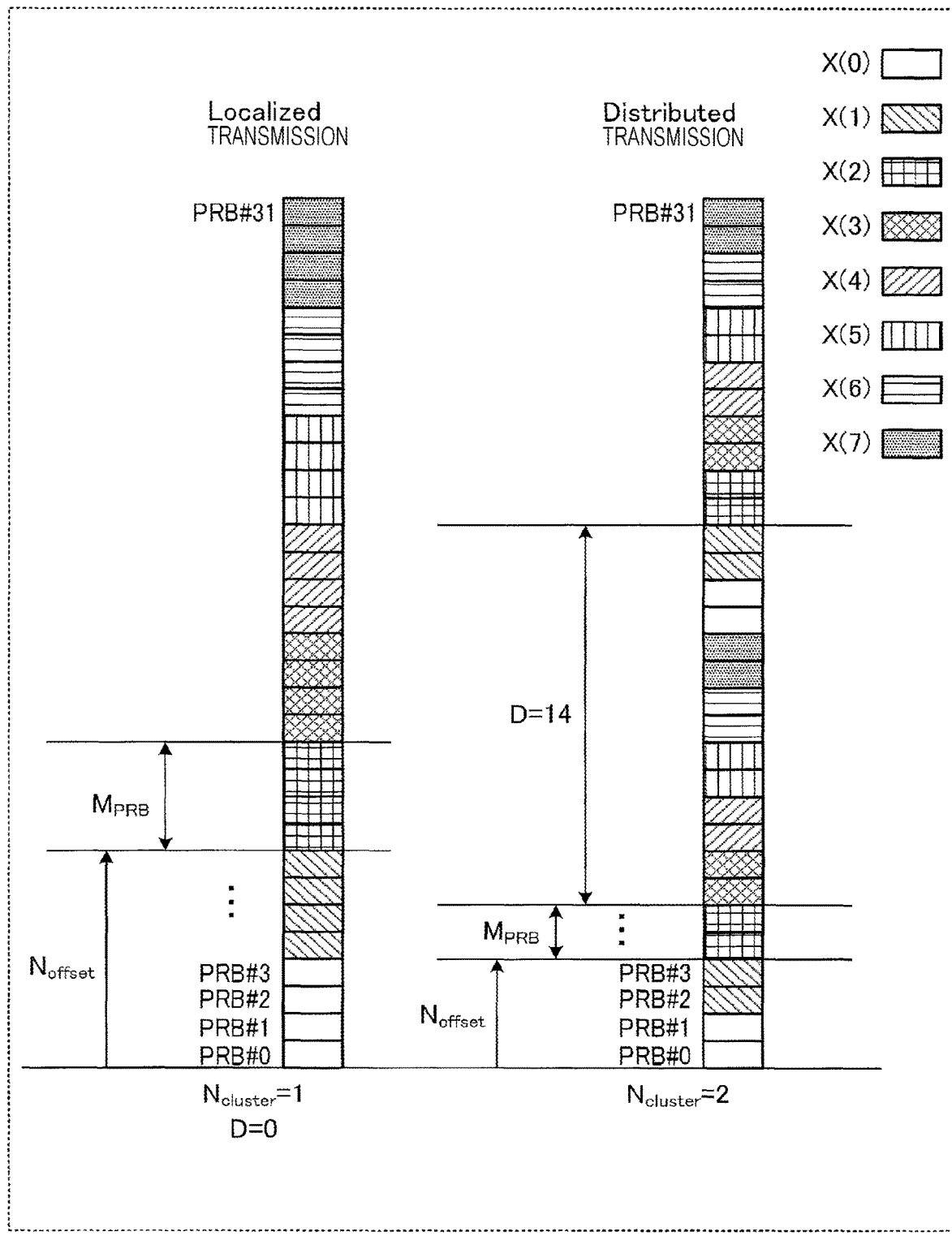
FIG. 11 illustrates an example of frequency domain resources according to a first modification of the first embodiment.

FIG. 11 illustrates an example in a case of configuring information (X(0), X(1), . . . , X($N_X$)) regarding use of frequency domain resources using the above four parameters. In FIG. 11, the number of PRBs in the band is $N_{RB}$=32 and $N_X$=7.

In this case, 32 bits would be necessary to make indication regarding the information X regarding use of frequency domain resources by bitmap.

On the other hand, in a case of using the above four parameters in the Localized transmission illustrated in FIG. 11, indication of (X(0), X(1), . . . , X(7)) is made as illustrated in FIG. 12. Also, in a case of using the above four parameters in the Distributed transmission illustrated in FIG. 11, notification of (X(0), X(1), . . . , X(7)) is made as illustrated in FIG. 13.

At this time, the maximum number of bits necessary for indication regarding each of the four parameters is $\log_2 32=5$ bits. Thus, the number of bits necessary for indication of the information X regarding use of frequency domain resources is 20 bits.

According to the above, configuring the information (X(0), X(1), . . . , X($N_X$-1)) regarding use of frequency domain resources using the four parameters of start position starting from the edge of the band ($N_{offset}$), number of consecutive PRBs ($M_{PRB}$), cluster count ($N_{cluster}$), and inter-cluster distance (D), as in the first modification, enables indication by both mapping methods of Localized transmission and Distributed transmission, and the number of bits necessary for indication of the information X regarding use of frequency domain resources can be reduced.

Further, in the first modification, restrictions are applied to the range of values that the parameters configuring the information X regarding use of frequency domain resources can assume, thereby enabling further reduction in the number of bits necessary for indication of the information X regarding use of frequency domain resources, and reduction in the number of candidates for the information regarding use of frequency domain resources (X(0), X(1), . . . , X($N_X$)), as shown below.

<Start Position ($N_{offset}$) from Edge of Band (System Band or Band Allocable to Terminal 200)

Cases are assumed in NR where the bandwidth that the terminal 200 supports and the system band differ, with the bandwidth that the terminal 200 supports being narrower than the system bandwidth.

Figure 14:
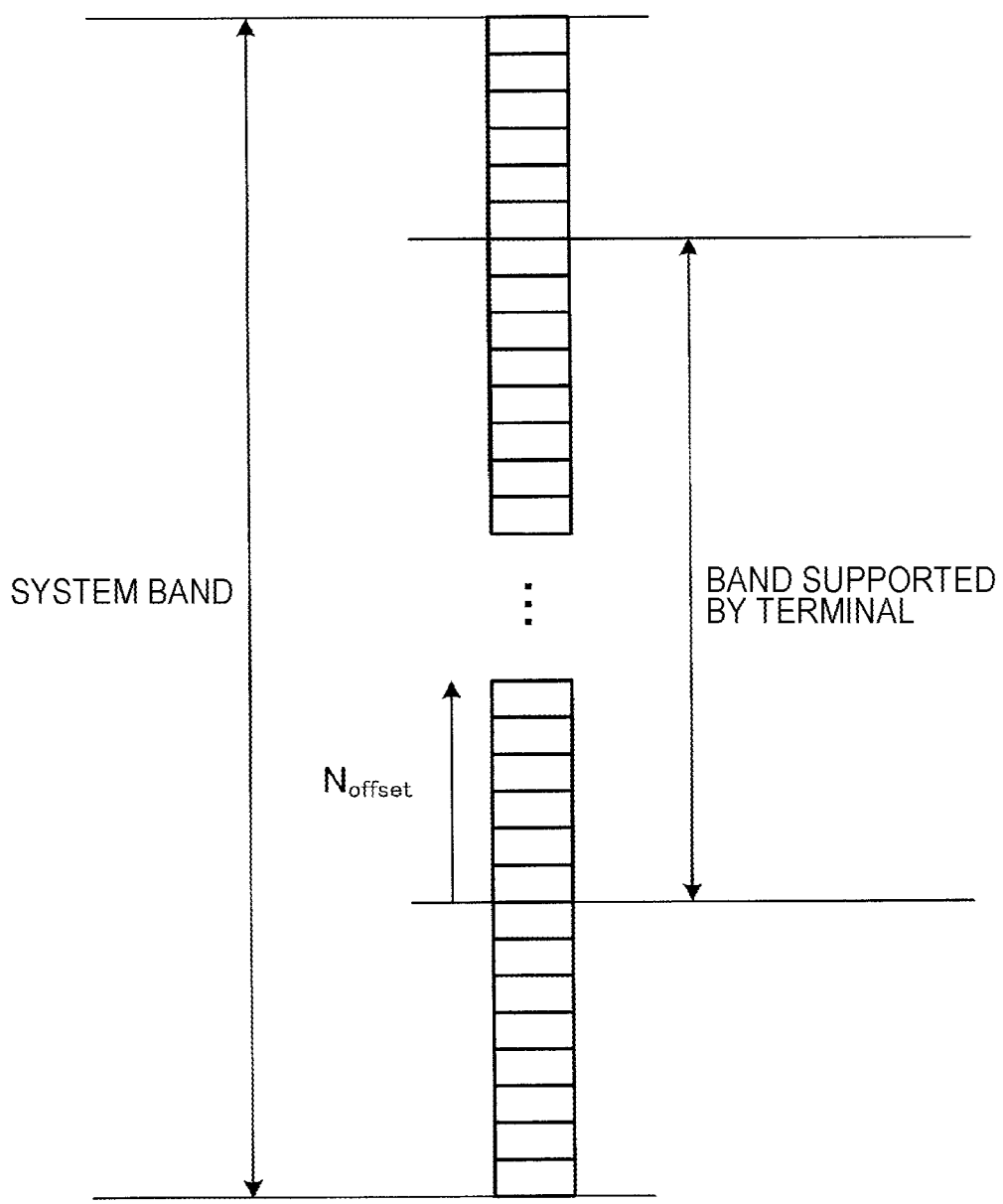
FIG. 14 illustrates a setting example of the range of a parameter $N_{offset}$ in the first modification of the first embodiment.

In this case, the start position from the edge of the band ($N_{offset}$) may use the edge of the band that the terminal 200 supports as a reference, as illustrated in FIG. 14. The range of values of the start position from the edge of the band ($N_{offset}$) may also be the range of the bandwidth that the terminal 200 supports.

Also, NR supports Short PUCCH where PUCCH is transmitted using one symbol or two symbols, and Long PUCCH where PUCCH is transmitted using three or more symbols, for example. Applying frequency hopping within the slot to obtain frequency diversity effects is being studied regarding Long PUCCH. Accordingly, in a case of assuming applying frequency hopping symmetrically as to the middle frequency of the system band or the band that the terminal 200 supports, it is sufficient for the range of values from the start position from the edge of the band ($N_{offset}$) to be a range of half the bandwidth of the system band or the band of the band that the terminal 200 supports.

Thus, restricting the range of the value for the start position from the edge of the band ($N_{offset}$) enables the necessary number of bits to make indication of the start position from the edge of the band ($N_{offset}$) to be reduced.

<Consecutive Number of PRBs ($M_{PRB}$)>

The object of applying Long PUCCH that uses symbols of three or more symbols is extended coverage. Accordingly, from the perspective of using resources used for PUCCH transmission, it is more important to increase time domain resources for Long PUCCH than increase frequency domain resources. Making the smallest unit of PUCCH resources in the frequency domain to be one PRB is being studied for Long PUCCH.

Accordingly, number of consecutive PRBs ($M_{PRB}$)=1 can always be set for Long PUCCH.

Also, stipulating multiple PUCCH formats in accordance with the number of bits transmitted by the PUCCH is being studied in NR. In this case, the terminal 200 can identify the number of consecutive PRBs ($M_{PRB}$) by the PUCCH format that has been set, even if the number of consecutive PRBs ($M_{PRB}$) is not indicated as the parameter X.

Also, settings where the number of consecutive PRBs ($M_{PRB}$)=2 or greater enables effects of improved PUCCH transmission characteristics to be obtained by channel estimation using multiple PRBs. Accordingly, settings where the number of consecutive PRBs ($M_{PRB}$)=2 or greater is conceivable in NR. That is to say, 1 (one PRB) can be excluded from the range of values of the number of consecutive PRBs ($M_{PRB}$).

Thus, limiting the range of values of the number of consecutive PRBs ($M_{PRB}$) enables the number of bits necessary for indication of the number of consecutive PRBs ($M_{PRB}$) to be reduced.

<Number of Clusters ($N_{cluster}$)>

As described above, from the perspective of using resources used for PUCCH transmission, it is more important to increase time domain resources for Long PUCCH than increase frequency domain resources. Making the smallest unit of PUCCH resources in the frequency domain to be one PRB is being studied. Also, increasing the number of clusters raises the transmission power to average power ratio.

Accordingly, number of clusters ($N_{cluster}$)=1 can always be set for Long PUCCH.

Obtaining frequency diversity effects by Distributed transmission is being studied regarding Short PUCCH. Note however, that frequency difference among clusters is more important than number of clusters for frequency diversity effects. Accordingly, a large number of clusters does not need to be used in PUCCH transmission. For example, this can be restricted to around number of clusters ($N_{cluster}$)=4. Further, number of clusters ($N_{cluster}$)=2 can always be set. Note that the value to which the number of clusters ($N_{cluster}$) is limited is not restricted to 2 or 4, and may be other values.

Thus, limiting the range of values of the number of clusters ($N_{cluster}$) enables the number of bits necessary for indication of the number of clusters ($N_{cluster}$) to be reduced.

<Inter-Cluster Distance (D)>

The inter-cluster distance D may assume a value related to the bandwidth and number of consecutive PRBs ($M_{PRB}$). For example, in a case where the number of PRBs in the band is $N_{PRB}$, the inter-cluster distance D can be expressed as D=$N_{PRB}$/$M_{PRB}$. That is to say, the terminal 200 is capable of identifying the bandwidth ($N_{PRB}$) and number of consecutive PRBs ($M_{PRB}$) even without being indicated of the inter-cluster distance D as parameter X.

Thus, the number of bits necessary for indication of the inter-cluster distance D can be reduced.

As described above, applying restrictions to the range of values that the parameters configuring the information (X(0), X(1), . . . , X($N_X$)) regarding use of frequency domain resources can assume enables further reduction in the number of bits necessary for indication of the information X regarding use of frequency domain resources, and reduction in the number of candidates for the information X regarding use of frequency domain resources.

Second Modification of First Embodiment

Description will be made regarding number of consecutive PRBs ($M_{PRB}$) and the inter-cluster distance (D) making up the information X regarding use of frequency domain resources.

Mixed numerology, where signal waveforms of different subcarrier spacings or the like coexist in the same band is being studied in NR, as a method to enable accommodation of services with different requirements.

Figure 15:
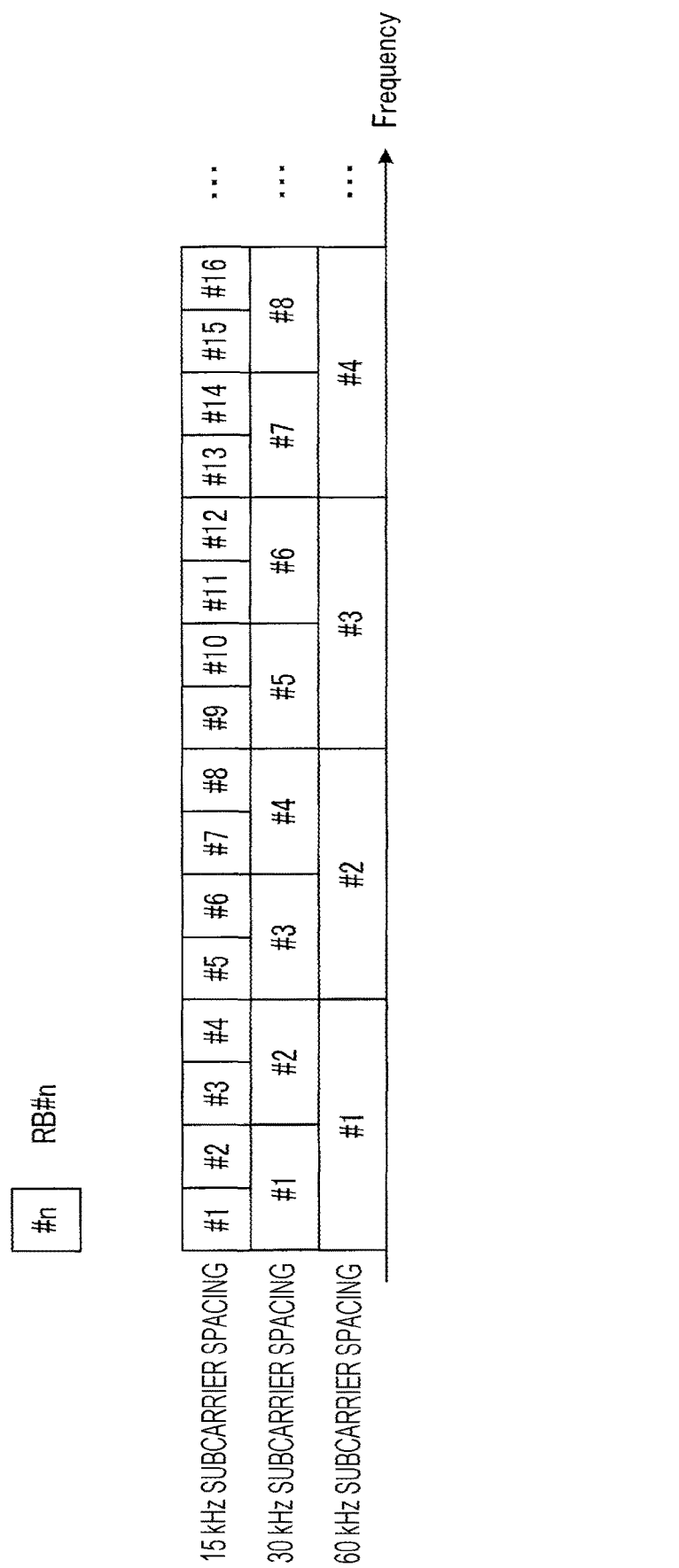
FIG. 15 illustrates an example of an RB grid among Numerologies with different subcarrier spacings.

There is also being studied in NR configuring a PRB of 12 subcarriers regardless of subcarrier spacing. Agreement has been reached in the 3GPP that, in a case of frequency division multiplexing (FDM: Frequency Division Multiplexing) of Numerology having different subcarrier spacings, the RB grid among the subcarrier spacings is the Nested structure illustrated in FIG. 15. Note that the assignment of RB grid indices. illustrated in FIG. 15 is one example, and not restrictive.

In the second modification, the number of consecutive PRBs ($M_{PRB}$) and inter-cluster distance (D) are set to a power of 2 in a case where terminals 200 with different subcarrier spacings coexist.

Figure 16:
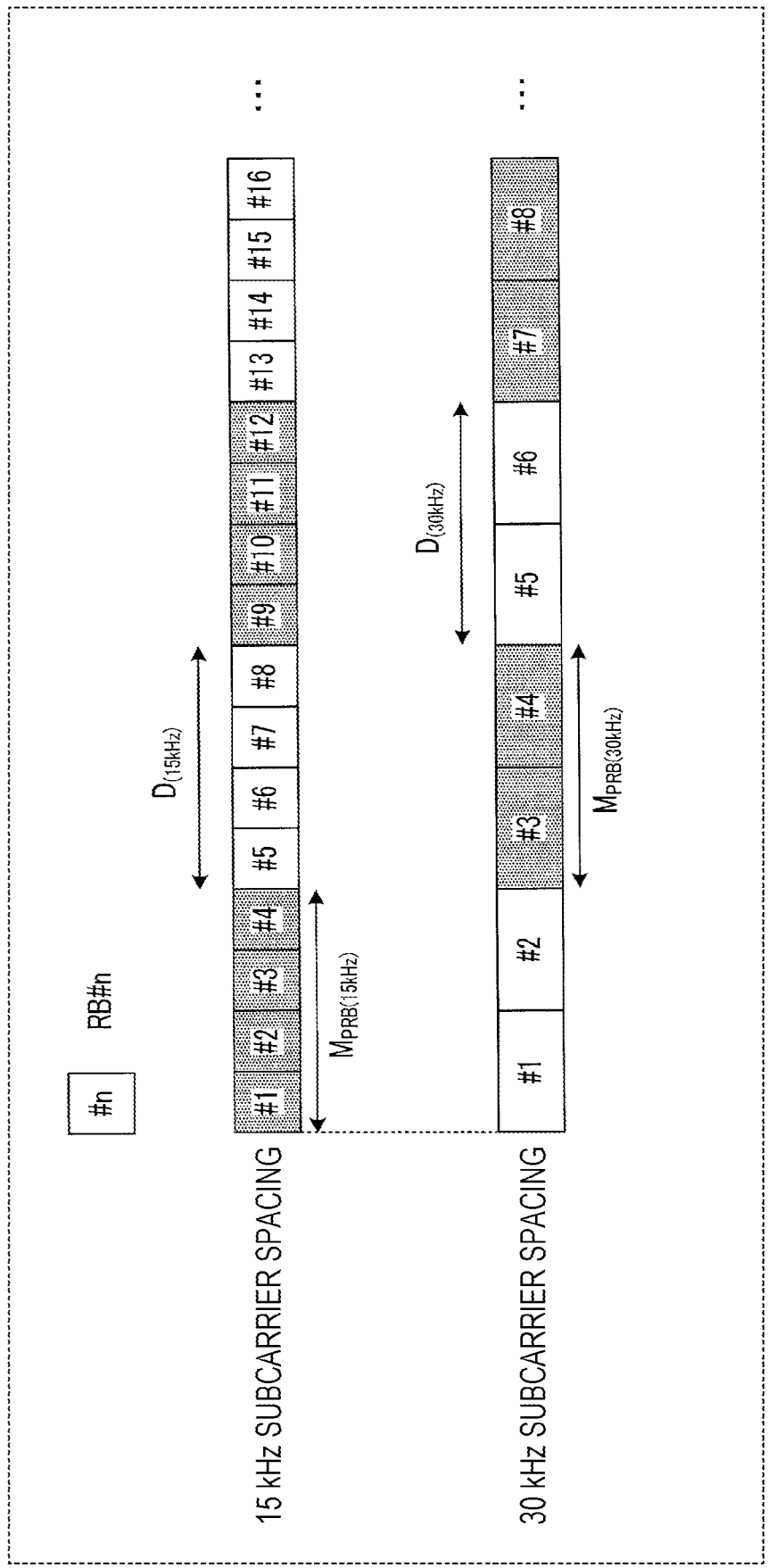
FIG. 16 illustrates a setting example of parameters $M_{PRB}$ and D according to a second modification of the first embodiment.

Setting the number of consecutive PRBs ($M_{PRB}$) and inter-cluster distance (D) to a power of 2 enables the clusters and boundaries of RB grids to be aligned among Numerologies of different subcarrier spacings, so resources can be efficiently used, as illustrated in FIG. 16, for example. Note that FIG. 16 illustrates an RB grid example where a terminal 200 having a certain subcarrier spacing (15 kHz here) and a terminal 200 having a subcarrier spacing that is double (30 kHz) are multiplexed. Also, although both the number of consecutive PRBs ($M_{PRB}$) and inter-cluster distance (D) are set to four PRBs (=$2^2$) in FIG. 16 as one example, the $M_{PRB}$ and inter-cluster distance D may be another power of 2 value, and may be different from each other.

Also, if the inter-cluster distance is set to D=$N_{PRB}$/$M_{PRB}$, the number of PRBs within the band can also be made to be a power of 2.

Further, an arrangement may be made where the number of consecutive PRBs ($M_{PRB}$) and inter-cluster distance (D) respectively are ($M_{PRB,\ 0}$) and inter-cluster distance ($D_0$) in a subcarrier spacing that is a reference (reference subcarrier spacing), and the terminal 200 identifies each of the number of consecutive PRBs ($M_{PRB}$) and inter-cluster distance (D) at another subcarrier spacing from the number of consecutive PRBs ($M_{PRB}$) and inter-cluster distance (D) at the reference subcarrier spacing.

For example, the number of consecutive PRBs ($M_{PRB}$) and inter-cluster distance (D) at another subcarrier spacing may be set to be the same as the number of consecutive PRBs ($M_{PRB,\ 0}$) and inter-cluster distance ($D_0$) at the reference subcarrier spacing. Alternatively, the frequency bandwidth of the number of consecutive PRBs and inter-cluster distance may be made to be the same among different subcarrier spacings, by setting the number of consecutive PRBs ($M_{PRB}$) and inter-cluster distance (D) at another subcarrier spacing=$f_0 \times 2^N$ (where $f_0$ is the reference subcarrier spacing) to be $M_{PRB,\ 0}$/N and $D_0$/N, respectively.

Thus, setting the number of consecutive PRBs ($M_{PRB}$) and inter-cluster distance (D) to be a power of 2 enables resources to be efficiently used, and this does away with the need to set the number of consecutive PRBs ($M_{PRB}$) and inter-cluster distance (D) for each different Numerology.

Third Modification of First Embodiment

The parameter (D) making up the information X regarding use of frequency domain resources will be described.

NR supports Short PUCCH where PUCCH is transmitted using one symbol or two symbols, and Long PUCCH where PUCCH is transmitted using three or more symbols, as described above.

Obtaining frequency diversity effects by Distributed transmission is being studied regarding Short PUCCH. On the other hand, applying frequency hopping within the slot to obtain frequency diversity effects is being studied regarding Long PUCCH. Also, applying Localized transmission to Long PUCCH instead of applying cluster transmission (i.e., Distributed transmission) is conceivable.

Accordingly, in the third modification, the base station 100 makes indication of different information for a case of Short PUCCH and for a case of Long PUCCH, with regard to the parameter (D) making up the information (X(0), X(1), . . . , X($N_X$)) regarding use of frequency domain resources.

Figure 17A:
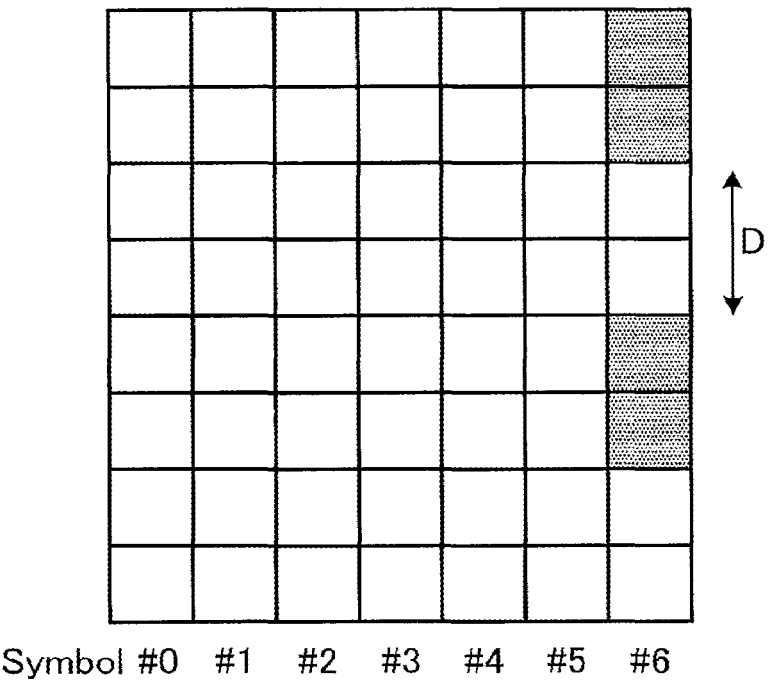
FIG. 17A illustrates a setting example of a parameter D as to a Short PUCCH according to a third modification of the first embodiment.
Figure 17B:
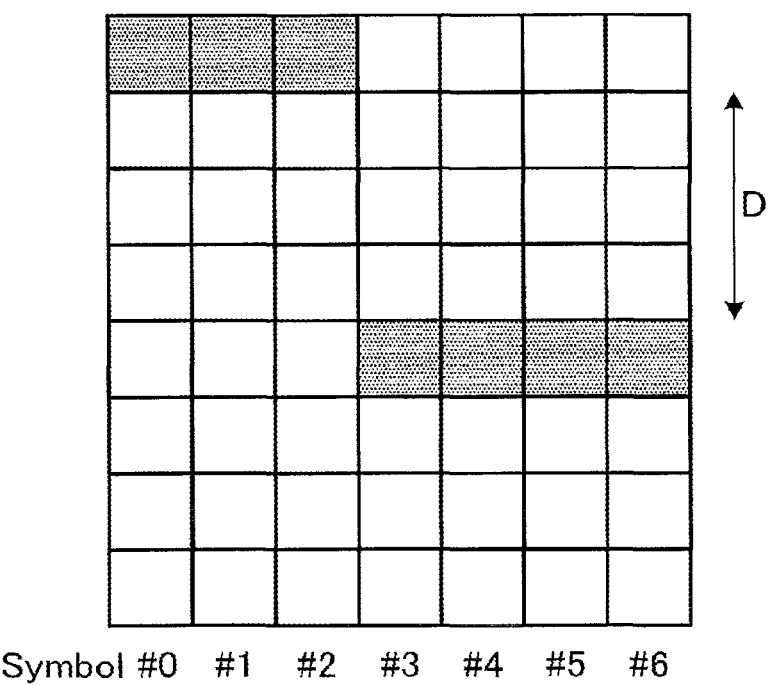
FIG. 17B illustrates a setting example of a parameter D as to a Long PUCCH according to the third modification of the first embodiment.

For example, the base station 100 makes indication of inter-cluster distance using the parameter (D) for Short PUCCH, as illustrated in FIG. 17A. On the other hand, the base station 100 makes indication of frequency hopping distance within the slot (or among slots) for Long PUCCH, as illustrated in FIG. 17B. That is to say, the parameter D indicating the inter-cluster distance in the case of Short PUCCH indicates the frequency hopping distance in the case of Long PUCCH.

Thus, the overhead of parameters to be notified from the base station 100 to the terminal 200 can be reduced by switching the value to be indicated using the parameter D in accordance with the PUCCH format.

Fourth Modification of First Embodiment

Information B regarding time domain resources (symbol position) will be described.

NR supports Short PUCCH where PUCCH is transmitted using one symbol or two symbols, and Long PUCCH where PUCCH is transmitted using three or more symbols, as described above.

In the fourth modification, the range of information (B(0), B(1), ..., B($N_B$)) regarding time domain resources (symbol position) is different between Short PUCCH and Long PUCCH. Further, the range of information (B(0), B(1), ..., B($N_B$)) regarding time domain resources (symbol position) may be different in accordance with the PUCCH transmission period (number of symbols in the PUCCH resources).

For example, the range of values that parameter B(n) can assume in a slot of seven symbols (#0 through #6) is 0 to 6 in a case of a one-symbol Short PUCCH. That is to say, PUCCH transmission can be performed using any symbol within the slot in a case of a one-symbol Short PUCCH.

On the other hand, the range of values that parameter B(n) can assume is 1 to 6 (starting position at end) or 0 to 5 (starting position from start) in a case of a two-symbol Short PUCCH. That is to say, an arrangement can be made where the one last or start symbol in the slot is not included in the range of values that B(n) can assume.

Making the minimum number of symbols to be four symbols in the case of Long PUCCH is being studied. Accordingly, the range of values that B(n) can assume is 3 to 6 (starting position at end) or 0 to 3 (starting position from start). That is to say, an arrangement can be made where the three last or start symbols in the slot are not included in the range of values that B(n) can assume.

Further, the information B(n) regarding time domain resources (symbol position) may have the values that can be assumed limited in relation with information regarding PUCCH transmission period (symbol) (C(0), C(1), ..., C($N_C$)). Inversely, there are cases where the information regarding PUCCH transmission period (C(0), C(1), ..., C($N_C$)) has the values that it can assume restricted in relation with the information B(n) regarding time domain resources (symbol position). That is to say, the range of the parameter B and the parameter C may be associated.

Thus, according to the fourth modification, overhead for higher layer signals can be reduced by reducing the number of bits necessary for indication of information B regarding time domain resources (symbol position) or information C regarding PUCCH transmission period, or the number of candidates.

Fifth Modification of First Embodiment

Figure 18:
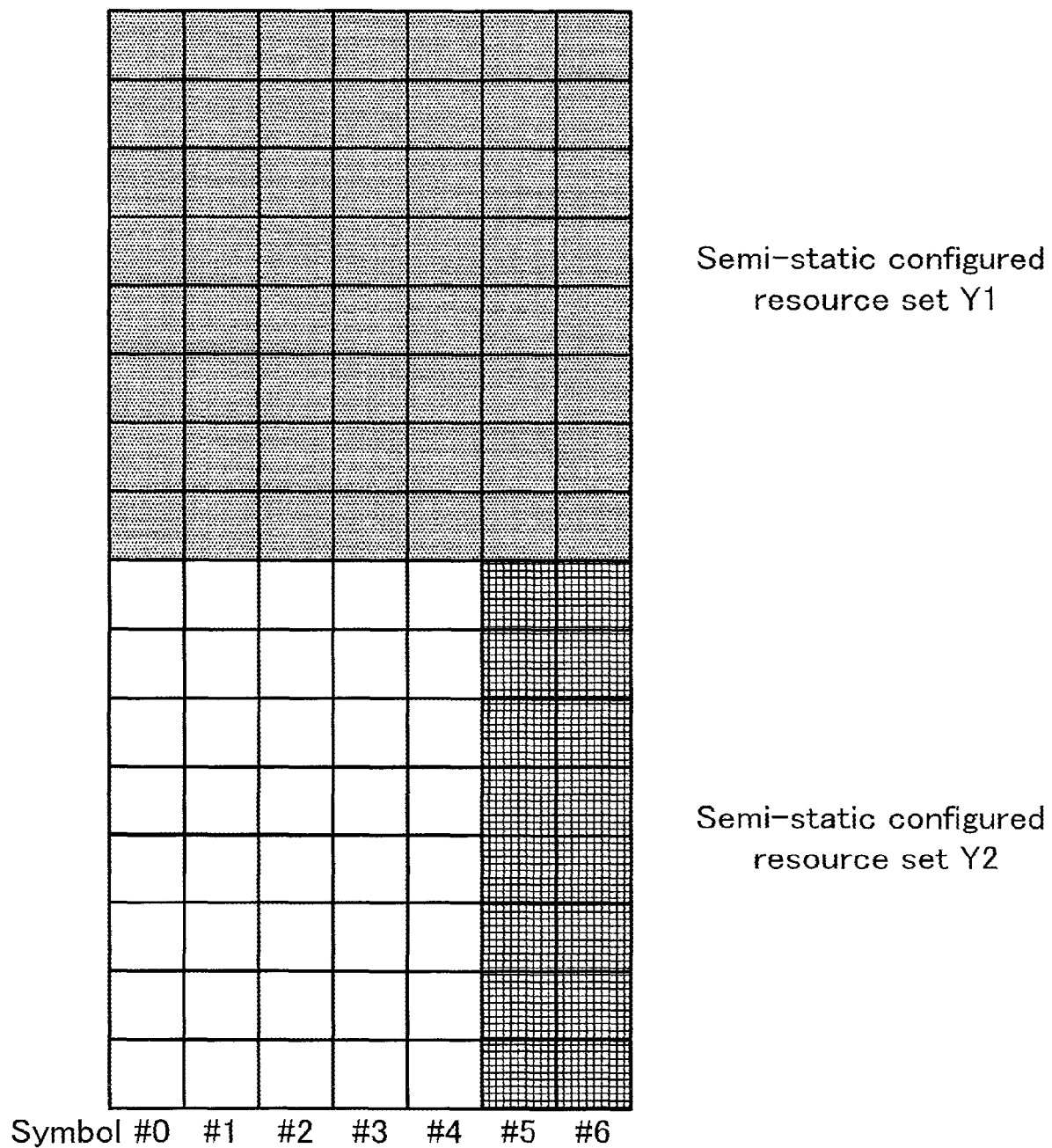
FIG. 18 illustrates an example of an Uplink control resource set according to a fifth modification of the first embodiment.

In the following, a set of resources where PUCCH can be transmitted will be defined as an uplink control resource set (Uplink control resource set). FIG. 18 illustrates an example where two Uplink Control resource sets Y1 and Y2 have been set.

In the fifth modification, the Semi-static resource configuration for PUCCH and the Uplink control resource set are associated, with the Semi-static resource configuration being different for each Uplink control resource set.

For example, different Uplink Control resource sets Y1 and Y2 are set for Long PUCCH and Short PUCCH. Specifically, in the case of Long PUCCH, the Semi-static resource configuration for PUCCH is configured of the resource set Y1, and in a case of Short PUCCH, the Semi-static resource configuration for PUCCH is configured of the resource set Y2.

Using group common downlink control signals (Group common PDCCH) with multiple terminals as the object, in addition to terminal-specific PDCCH, is being studied in NR. In this case, indication can be made of the resource amounts (e.g., number of symbols) of the Uplink Control resource set by Group common PDCCH. In this case, indication regarding the resource amount of the Uplink Control resource set of Group common PDCCH and the Semi-static resource configuration for PUCCH can be associated. For example, an arrangement may be made where, in a case where there is indication of resource amount Z1 of the Uplink Control resource set by Group common PDCCH, the Semi-static resource configuration for PUCCH is configured of the resource set Y1, and in a case where there is indication of resource amount Z2 of the Uplink Control resource set by Group common PDCCH, the Semi-static resource configuration for PUCCH is configured of the resource set Y2.

Also, elements that cause resource sets configuring the Semi-static resource configuration to be different are not restricted to the above described Long PUCCH/Short PUCCH and indication of the resource amount of the Uplink Control resource set by Group common PDCCH, and may be System Frame Number (SFN), slot index, or uplink resource amount or the like.

Also note that control resource set may be referred to as "CORESET".

Notes on First Embodiment

A case has been described in the present embodiment where indication is made of the Semi-static resource configuration for PUCCH using terminal-specific higher layer signals. However, terminal-specific upper layer signals cannot be used for indication regarding the Semi-static resource configuration for PUCCH at the stage of initial access (e.g., the stage before ST106 in FIG. 9). Accordingly, the Semi-static resource configuration may be indicated using cell-specific or group-specific higher layer signals such as SIB or the like, in the PUCCH resource allocation at the initial access stage.

PUCCH resource allocation necessary at the initial access stage is allocation for PUCCH transmitting ACK/NACK signals as to Message 4.

The base station 100 can indicate the terminal 200 of the resource settings (Semi-static resource configuration) including the multiple combination of parameters relating to PUCCH resources by cell-specific or group-specific higher layer signals such as SIB or the like (RMSI: Remaining minimum system information), and select one combination of parameters relating to the PUCCH resources to be actually used, according to the number of bits of the DCI of the PDCCH where the corresponding Message 4 has been allocated.

Note that the same Semi-static resource configuration is indicated among the multiple terminals 200 at this time, so an arrangement is necessary to prevent PUCCH resources from colliding among terminals 200. Examples of an arrangement necessary to prevent PUCCH resources from colliding among terminals 200 include a method of correlating PUCCH resources with RNTI, PDCCH resource (e.g., CCE) or PDSCH resources.

Now, the smaller the overhead of cell-specific or group-specific higher layer signals such as SIB or the like (RMSI)

is, the better. Accordingly, several parameters (e.g., PUCCH transmission period) may be decided beforehand regarding PUCCH resources allocation for transmission of ACK/NACK signals to Message 4.

For example, with regard to the PUCCH transmission period (whether to use Long PUCCH or use Short PUCCH), Long PUCCH may be always used for ACK/NACK signals to Message 4, since PUCCH transmission for ACK/NACK signals to Message 4 needs robust transmission.

Also, the PUCCH transmission period for ACK/NACK signals to Message 4 (whether to use Long PUCCH or use Short PUCCH) may be decided based on the transmission method for Message 2 or Message 3. For example, in a case where Message 2 or Message 3 are slot-based transmission, Long-PUCCH may be used for ACK/NACK signals to Message 4, and in a case where Message 2 or Message 3 are non-slot-based transmission, Short-PUCCH may be used for ACK/NACK signals to Message 4.

Also, description has been made in the present embodiment regarding PUCCH resource allocation at the time of transmitting ACK/NACK signals in downlink HARQ. However, the above-described PUCCH resource allocation is not restricted to a case of transmitting ACK/NACK signals in downlink HARQ, and can be applied to a case of transmission of Aperiodic CSI. This same method can also be applied to resource allocation for Aperiodic SRS that the terminal 200 transmits to the base station 100 for uplink CSI measurement.

Second Embodiment

The base station and terminal according to the present embodiment have the basic configuration in common with the base station 100 and terminal 200 according to the first embodiment, so description will be made with reference to FIG. 7 and FIG. 8.

Description has been made in the first embodiment regarding PUCCH resource allocation in a case of transmitting ACK/NACK signals in downlink HARQ. Description has also been made in the first embodiment that the same resource allocation method can be applied to a case of transmitting Aperiodic CSI or Aperiodic SRS.

On the other hand, PUCCH is also used in a case of periodically transmitting CSI (periodic CSI) or SR or the like. In the same way, there is periodic transmission regarding SRS (periodic SRS) as well.

There is no dynamic indication to the terminal 200 by PDCCH with regard to these periodically-transmitted uplink control signals. Accordingly, the terminal 200 is not able to be indicated of Semi-static resource configuration (multiple combinations of parameters) by higher layer signals and identify the combination of parameters relating the resources for actual transmission by DCI, as in the method illustrated in the first embodiment.

Accordingly, for resources in a case of transmitting periodic signals, there is a need for the base station 100 to make one or multiple indications to the terminal 200 beforehand regarding the combination of parameters relating to resources that will actually be transmitted.

Figure 19:
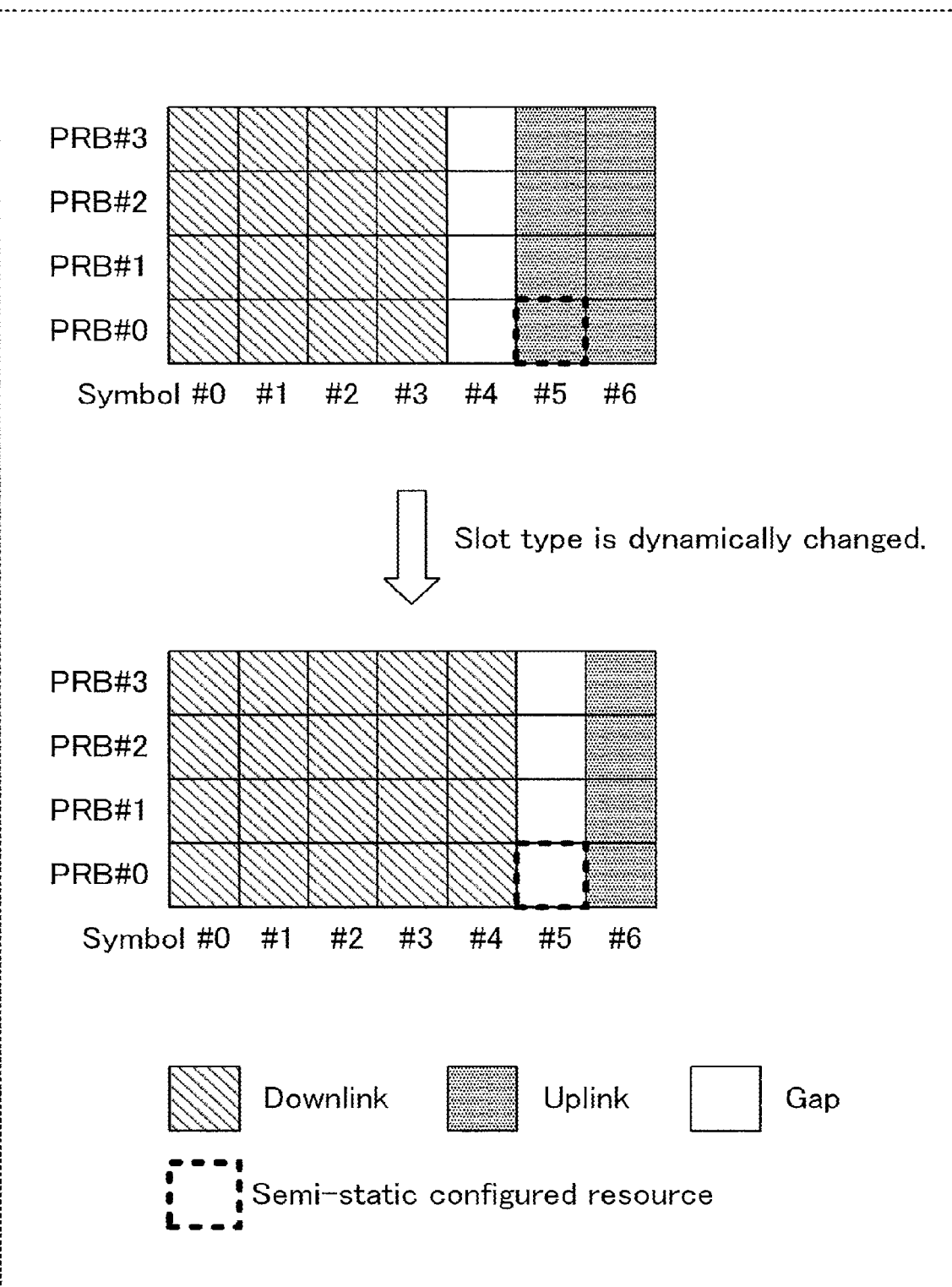
FIG. 19 describes a problem of a second embodiment.

However, in a case where the slot type or the number of uplink symbols within the slot dynamically changes, as illustrated in FIG. 19 for example, resources that have been Semi-statically indicated (set) are no longer uplink resources, and it is conceivable that the terminal 200 cannot use as uplink control signals. For example, in FIG. 19, the resources of PRB #0 and symbol #5 are Semi-statically set as uplink resources. In this case, the terminal 200 was using these resources to perform periodic transmission of uplink control signals, but at a certain timing, the resources of PRB #0 and symbol #5 have been set to be a gap, and the resources allocated to Semi-static are no longer usable as resources.

Now, the base station 100 can indicate the terminal 200 of slot types or resource amount (number of symbols, etc.) usable for uplink by Group common PDCCH.

Accordingly, in the present embodiment, the terminal 200 receives and decodes the Group common PDCCH and obtain information relating to resources usable for uplink, and thereby judges whether or not resources that had been allocated to Semi-static can be used as resources for transmitting periodic signals. In a case where resources that had been allocated to Semi-static can be used as resources for transmitting periodic signals, the terminal 200 uses these resources to transmit periodic uplink control signals (CSI, SRS, SR).

On the other hand, in a case where resources that had been allocated to Semi-static cannot be used as resources for transmitting periodic signals, the terminal 200 may implement the following methods 1 and 2.

Method 1

The terminal 200 drops transmission of periodic signals (non-transmission). Now, it is conceivable that even if part of transmission of periodic signals is missing, there are no great effects on characteristics. Accordingly, by the terminal 200 not transmitting periodic signals by symbols that are not uplink resources, interference with signals transmitted by other terminals using these resources can be prevented.

Method 2

The terminal 200 identifies resources for transmitting periodic signals, using information relating to resources useable for uplink that is obtained from Group common PDCCH. For example, in a case where the number of uplink symbols $N_{UL}$ is indicated by Group common PDCCH, the terminal 200 identifies the symbol position B(n) by B(n) mod $N_{UL}$. According to this method, there is no need to drop periodic signals.

As one example, assumption will be made that three symbols from the end of the slot have been indicated as symbol position B(n). At this time, when the last two symbols in the slot are indicated by Group common PDCCH as number of symbols $N_{UL}$, symbol position B(n) is no longer an uplink resource. In this case, the terminal 200 identifies one symbol from the end of the slot as symbol position B(n) due to B(n) mod $N_{UL}$. Accordingly, even in a case where the number of uplink symbols within the slot has been dynamically changed, the terminal 200 can transmit uplink control signals using uplink resources after the change.

As described above, according to the present embodiment, PUCCH resources can be flexibly allocated to uplink control signals periodically transmitted, such as CSI (periodic CSI), SR, or the like.

Third Embodiment

The base station and terminal according to the present embodiment have the basic configuration in common with the base station 100 and terminal 200 according to the first embodiment, so description will be made with reference to FIG. 7 and FIG. 8.

Description was made in the second embodiment regarding uplink resources allocated to periodically transmitted signals, of a case where Semi-statically indicated resources are no longer uplink resources due to the slot type or the number of uplink symbols within the slot dynamically changing, and cannot be used for transmission of these signals (e.g., see FIG. 19).

On the other hand, regarding resources transmitting non-periodic signals (ACK/NACK signals, Aperiodic CSI, Aperiodic SRS, etc.) described in the first embodiment as well, there is the possibility that the entirety of a Semi-statically indicated Resource configuration is no longer uplink resources due to the slot type or number of uplink symbols within the slot dynamically changing, and cannot be used for transmission of these signals.

In such a case as well, it is undesirable for the terminal 200 to drop non-periodic signals (particularly ACK/NACK and so forth) as in Method 1 of the second embodiment. In the present embodiment, the base station 100 and terminal 200 implement the following method.

Specifically, first, the base station 100 instructs the terminal 200 to receive and decode the Group common PDCCH using a terminal-specific PDCCH or the like. Note however, in a case where the terminal 200 constantly receives and decodes the Group common PDCCH, this instruction by the base station 100 is unnecessary.

Next, the terminal 200 receives and demodulates the Group common PDCCH, and obtains information relating to resources usable for uplink. The terminal 200 then identifies resources transmitting periodic signals, using information relating to resource usable for uplink, that has been obtained from the Group common PDCCH. For example, in a case where the number of uplink symbols $N_{UL}$ has been indicated by the Group common PDCCH, the terminal 200 identifies the symbol position B(n) from B(n) mod $N_{UL}$.

Accordingly, even in a case where resources transmitting non-periodic signals cannot be used due to the slot type or number of uplink symbols within the slot dynamically changing, the terminal 200 can identify resources usable for transmission of these signals, and perform transmission, without dropping non-periodic signals.

Fourth Embodiment

The base station and terminal according to the present embodiment have the basic configuration in common with the base station 100 and terminal 200 according to the first embodiment, so description will be made with reference to FIG. 7 and FIG. 8.

In the first embodiment, description has been made regarding a method where, with regard to allocation of PUCCH resources for transmission of uplink control signals (e.g., ACK/NACK signals), resource settings (Semi-static resource configuration) including multiple combinations of parameters relating to PUCCH resources are indicated to the terminal by the base station using higher layer signals, and one combination of parameters relating to the PUCCH resources to be actually used is selected by several bits of DCI of the PDCCH where corresponding downlink data has been allocated. Description has also been made in the first embodiment that parameters relating to PUCCH resources may include time domain resources (slot) and time domain resources (symbol position).

Now, NR supports transmission in units of slots (also referred to as Slot-based transmission or PDSCH mapping type A) and transmission in non-slot units (also referred to as Non-slot-based transmission, mini-slot-based transmission, or PDSCH mapping type B).

Figure 20A:
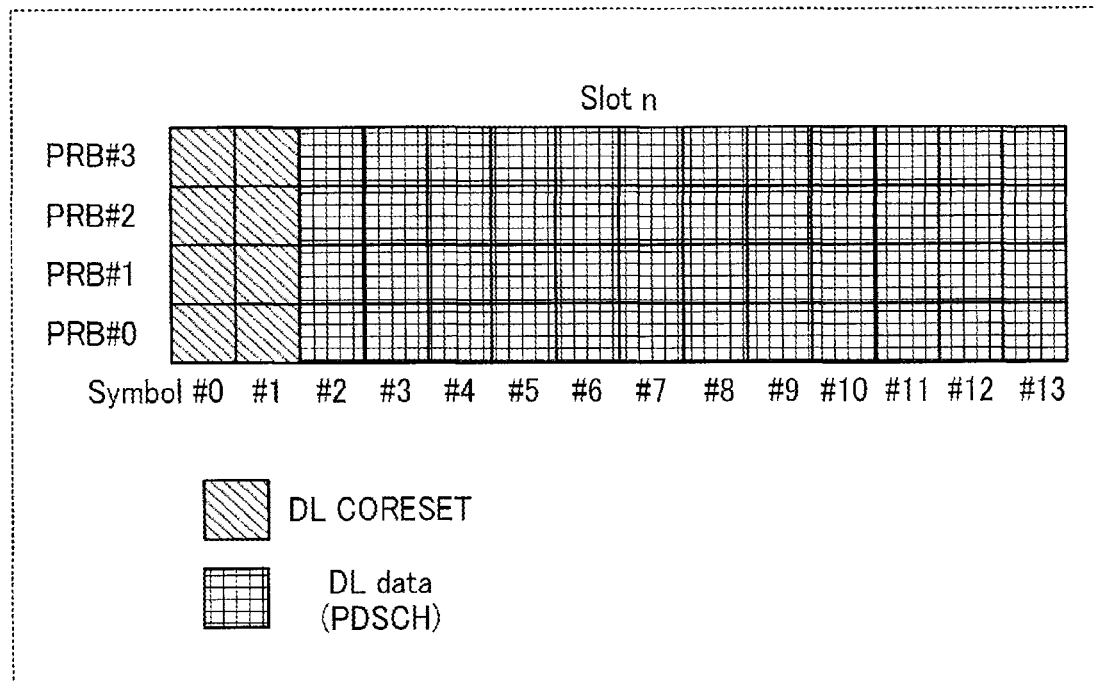
FIG. 20A illustrates an example of transmission in slot increments.
Figure 20B:
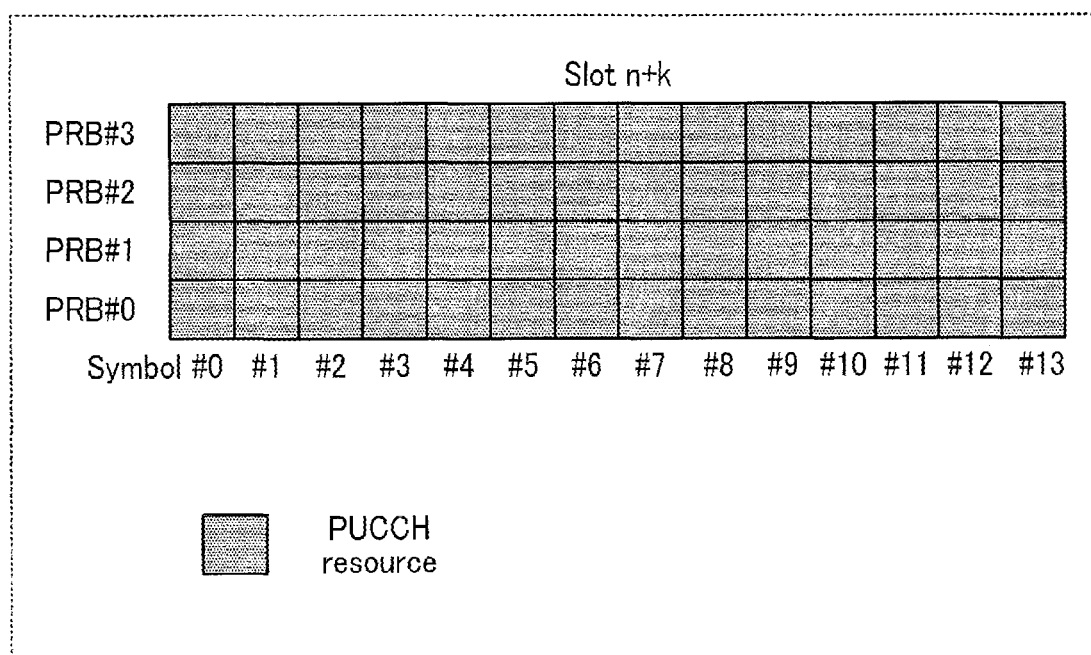
FIG. 20B illustrates an example of transmission in slot increments.

FIG. 20A and FIG. 20B illustrate an example of slot-based transmission. In FIG. 20A, the downlink data channel (PDSCH) mapped to the symbols #2 through #13 of slot n is scheduled by the downlink control channel (PDCCH) mapped to the symbols #0 and #1 of slot n. Also, the ACK/NACK signals corresponding to the PDSCH illustrated in FIG. 20A are transmitted using the PUCCH of slot n+k illustrated in FIG. 20B. Here, k is an integer of 0 or greater.

Figure 21:
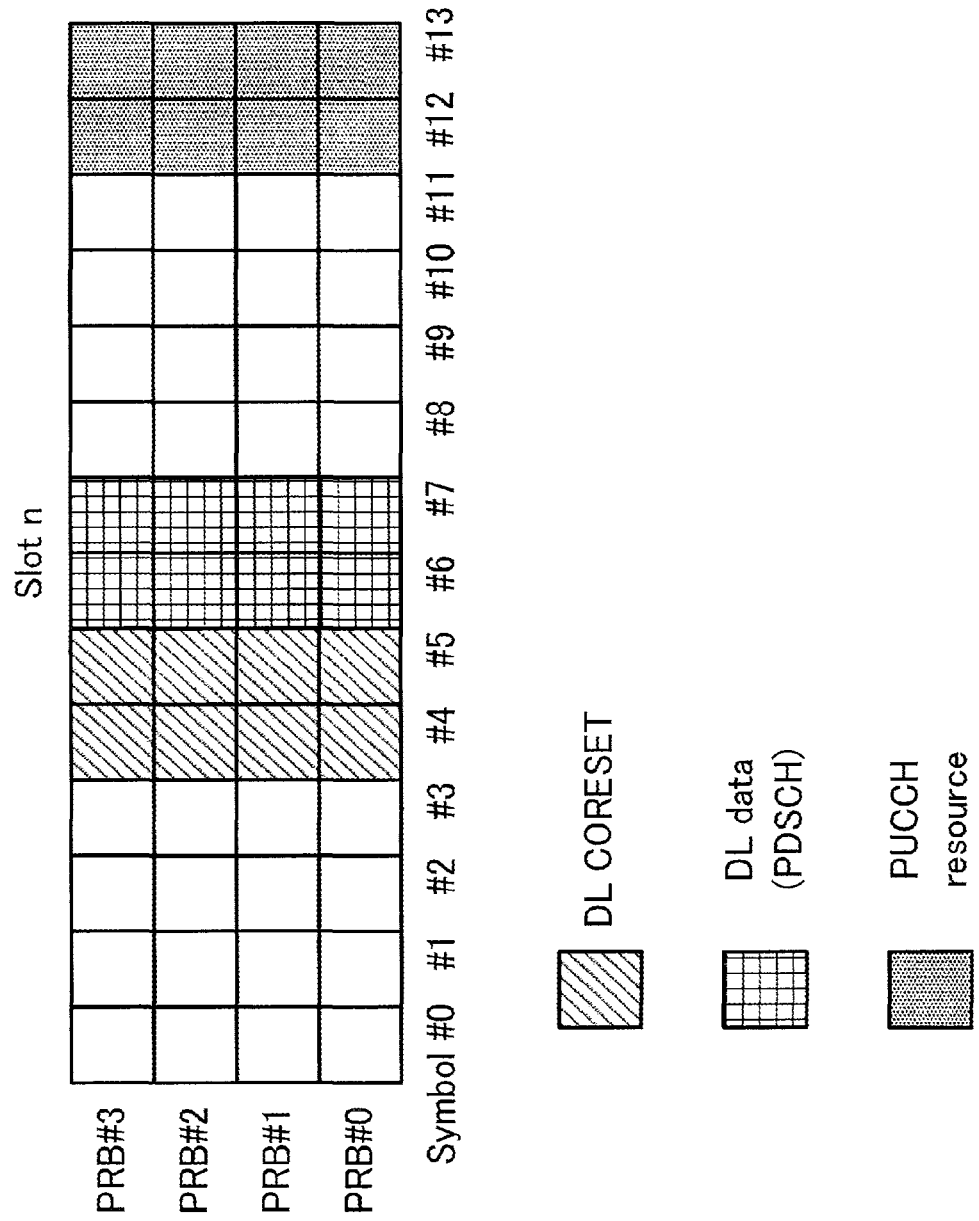
FIG. 21 illustrates an example of transmission in non-slot increments.

FIG. 21 illustrates an example of non-slot-based transmission. In FIG. 21, PDSCH mapped to symbols #6 and #7 of slot n are scheduled by PDCCH mapped to symbols #4 and #5 of slot n. Also, in FIG. 21, ACK/NACK signals corresponding to PDSCH are transmitted using PUCCH of symbols #12 and #13 in slot n.

Note that a set of resources capable of transmitting PDCCH is defined here as a downlink control resource set (Downlink control resource set, DL CORESET).

In slot-based transmission, DL CORESET is always mapped to the first two or three symbols of the slot, as illustrated in FIG. 20A. On the other hand, in non-slot-based transmission, DL CORESET can be mapped to any symbol in the slot, as illustrated in FIG. 21. For example, the DL CORESET can be mapped to the first two or three symbols of the slot even in non-slot-based transmission.

In a case where DL CORESET has been mapped to the first two or three symbols of the slot, the terminal has to distinguish whether the DL CORESET is a DL CORESET from slot-based transmission, or a DL CORESET from non-slot-based transmission. Accordingly, in a case where DL CORESET has been mapped to the first two or three symbols of the slot, it is assumed that indication will be used to distinguish whether the DL CORESET is a DL CORESET from slot-based transmission, or a DL CORESET from non-slot-based transmission. On the other hand, in a case where DL CORESET has been mapped to other than the first two or three symbols of the slot, the terminal can recognize that the DL CORESET is a DL CORESET from non-slot-based transmission.

Now, in slot-based transmission, indication of the slot position of time domain resources that is a parameter relating to PUCCH resources, is important, and it is necessary to be able to allocate slot positions more flexibly. On the other hand, in non-slot-based transmission, being able to allocate symbol positions more flexibly is necessary rather than slot positions, with regard to time domain resources that is a parameter relating to PUCCH resources.

Accordingly, in the present embodiment, the indication method is different for time domain resources (slot) and time domain resources (symbol position) serving as a parameter relating to PUCCH resources regarding the slot-based transmission and the non-slot-based transmission.

Specifically, in slot-based transmission, no parameter relating to time domain resources (slot) is included in the resource settings (Semi-static resource configuration) indicating the combination of multiple parameters relating to PUCCH resources. The base station 100 indicates the terminal 200 of resource settings (Semi-static resource configuration) including the combination of multiple parameters relating to PUCCH resources, using higher layer signals. The base station 100 also selects one combination of parameters relating to PUCCH resources to be actually used, by several bits of DCI of PDCCH to which corresponding downlink data has been allocated. At this time, time domain resources (symbol position) are included in the resource settings indicating the combination of multiple parameters relating to PUCCH resources. On the other hand, the base station 100 indicates the terminal 200 of parameters (settings) relating to time domain resources (slot) independently from the above resource settings using higher layer signals. The base station 100 then selects one slot (slot position) to be actually used, by several bits of DCI of PDCCH to which corresponding downlink data has been allocated.

On the other hand, in non-slot-based transmission, information relating to both time domain resources (slot) and time domain resources (symbol position) are included in resource settings (Semi-static resource configuration) indicating multiple combinations of parameters regarding PUCCH resources. At this time, it is conceivable that information relating to slots is not necessary as information relating to time domain resources in non-slot-based transmission. Accordingly, the base station 100 is capable of indication of information relating to time domain resources in units of symbols, in the above-described resource settings.

Also, in a case where DL CORESET is mapped to the first two or three symbols of the slot, the DCI size in slot-based transmission and the DCI size in non-slot-based transmission may be made to be the same in the indication of parameters (including information relating to slot) regarding PUCCH resources to be actually used, in order to reduce the number of times of performing blind decoding regarding PDCCH.

Accordingly, at least in a case where DL CORESET is mapped to the first two or three symbols of the slot, the base station 100 in the present embodiment may select and indicate of parameters relating to PUCCH resources using DCI of (X+Y) bits as illustrated in FIG. 22, to make the DCI size in slot-based transmission and the DCI size in non-slot-based transmission to be the same.

In slot-based transmission (PDSCH mapping type A), X bits are used for selection of time domain resources (slot) indicated to the terminal 200 independently from other parameters regarding PUCCH resources, and Y bits are used for selecting one combination of parameters regarding PUCCH resources, as illustrated in FIG. 22. On the other hand, in non-slot-based transmission (PDSCH mapping type B), X+Y bits are used for selection of one combination of parameters relating to PUCCH resources.

Accordingly, the base station 100 can allocate slot position more flexibly by indicating the terminal 200 of slot positions independently from parameters relating to other PUCCH resources in slot-based transmission. Also, in non-slot-based transmission, the base station 100 can allocate symbol positions more flexibly by indication of PUCCH resources in symbol granularity, for example. Thus, according to the present embodiment, flexible allocation of time domain resources (slot or symbol position) that is appropriate for each of slot-based transmission and non-slot-based transmission with regard to allocation of PUCCH resources can be performed.

Also, the DCI size is the same for slot-based transmission and non-slot-based transmission, so even in a case where DL CORESET is mapped to the first two or three symbols of the slot, there is no need to increase the number of times of blind decoding of PDCCH at the terminal 200.

Modification of Fourth Embodiment

A case has been described in the fourth embodiment where the base station 100 selects/indicates parameters regarding PUCCH resources using DCI of X+Y bits to make the DCI size the same for slot-based transmission and non-slot-based transmission, in a case where DL CORESET is mapped to the first two or three symbols of the slot.

On the other hand, in a case where DL CORESET has been mapped to other than the first two or three symbols of the slot, the terminal 200 can recognize that this DL CORESET is a DL CORESET from non-slot-based transmission. Further, non-slot-based transmission is expected to use URLLC (Ultra Reliable Low Latency Communication) where high reliability is required, so the DCI size is preferably minimized.

Accordingly, as a modification of the fourth embodiment, in a case where DL CORESET has been mapped to other than the first two or three symbols of the slot, the base station 100 may select and indicate of parameters regarding PUCCH resources using DCI of Y bits for DL CORESET in non-slot-based transmission, as illustrated in FIG. 23.

Thus, the DCI size can be reduced, encoding efficiency improved, and the transmission quality/reliability of PDCCH improved.

Fifth Embodiment

The base station and terminal according to the present embodiment have the basic configuration in common with the base station 100 and terminal 200 according to the first embodiment, so description will be made with reference to FIG. 7 and FIG. 8.

As described earlier, the number of symbols in a slot that can be used as PUCCH resources are dependent on the type of slot (Downlink centric slot, Uplink centric slot, Downlink only slot, Uplink only slot, and so forth) as illustrated in FIG. 3 in NR. The terminal can know the type of slot (downlink symbol count, uplink symbol count, etc.) from one of the following indications.

The first is Semi-static configuration (alternately referred to as Semi-static DL/UL configuration). Semi-static configuration is indicated by RRC signals. The second is SFI (Slot Format Indicator). SFI is indicated by group common downlink control signals (Group common PDCCH). The third is UE-specific assignment. UE-specific assignment is indicated by terminal-specific DCI. Information relating to the PUCCH transmission period in the resource settings indicating multiple parameter combination regarding PUCCH resources in the first embodiment also is a UE-specific assignment.

For example, in a case where the terminal can use a Semi-static configuration or SFI, the terminal can Implicitly decide the PUCCH transmission period and symbol position from the Semi-static configuration or SFI. That is to say, in a case where the terminal can use a Semi-static configuration or SFI, information relating to the PUCCH transmission period (symbol count) set by RRC signals does not have to be restricted to specific numerical values (e.g., C symbols (C=1 through 14), etc.).

Accordingly, in the present embodiment, a method where, in the resource settings (Semi-static resource configuration) by higher layer signals, the terminal 200 is not indicated of specific numerical values regarding the PUCCH transmission period and symbol positions by the base station 100, and the terminal 200 implicitly decides the PUCCH transmission period and symbol positions from the Semi-static configuration or SFI.

The base station 100 indicates the terminal 200 of the resource settings (Semi-static resource configuration) including multiple parameter combination regarding PUCCH resources by higher layer signals, and selects one combination of parameters regarding PUCCH resources to be actually used, by several bits of DCI of PDCCH to which corresponding downlink data has been allocated. In the present embodiment, the base station 100 makes indication regarding one or both of parameters regarding time domain resources (symbol) and parameters regarding PUCCH transmission period (the number of symbols) in the resource settings (Semi-static resource configuration) including multiple parameter combination regarding PUCCH resources, not by specific numerical values, but by a command such as, for example, "follow Semi-static configuration", "follow SFI", or the like.

In a case where one or both of parameters regarding time domain resources (symbol) and parameters regarding PUCCH transmission period for parameter combinations regarding PUCCH resources indicated by DCI indicate "follow Semi-static configuration" or "follow SFI", the terminal 200 transmits PUCCH using uplink symbols obtained by the Semi-static configuration indicated by RRC symbols or uplink symbols indicated by SFI.

That is to say, in the present embodiment, the resource settings (Semi-static resource configuration) indicated by higher layer signals do not include specific numerical values indicating symbol position in the slot or number of symbols, and the terminal 200 obtains the value indicting the symbol position or number of symbols of the PUCCH resources from the Semi-static configuration or SFI that are information indicating the slot type.

Note that the command relating to the PUCCH transmission period is not restricted to the commands indicating "follow Semi-static configuration" or "follow SFI", and may be a command indicating such as "all UL symbols in slot", "all UL symbols in slot—X symbols", or the like. Note that X symbols here may be a cell-specific semi-static value or may be a value notified by SFI or UE-specific assignment. X may be in a range of 1 to 6 symbols.

Figures 24A, 24B:
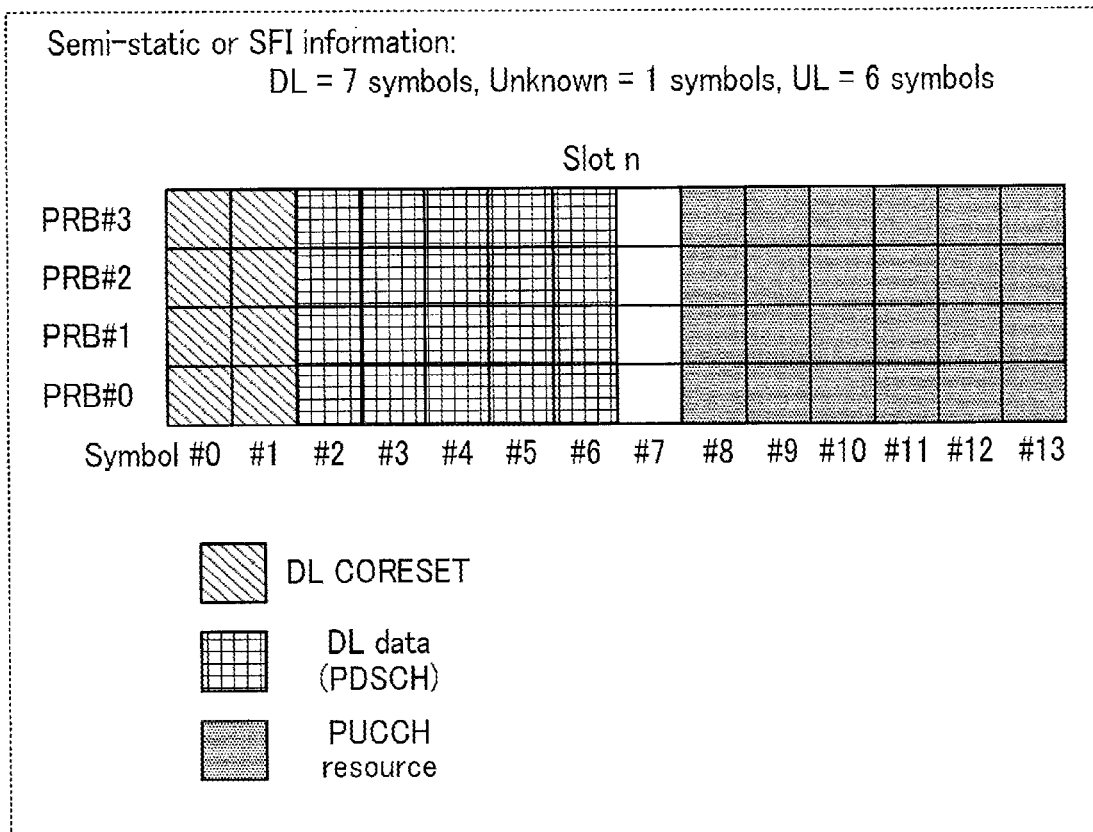
FIG. 24A illustrates a setting example of PUCCH resources according to a fifth embodiment.
FIG. 24B illustrates an example of correlation between DCI bits and Semi-static resource configuration according to the fifth embodiment.
Figure 25A:
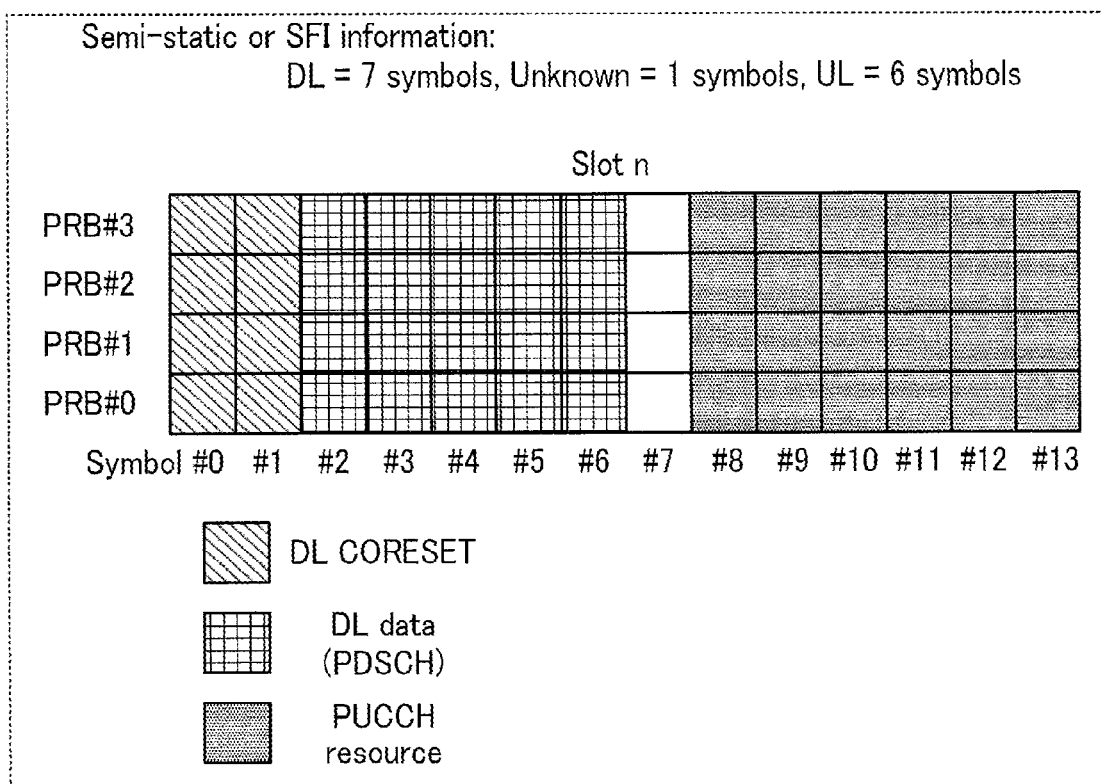
FIG. 25A illustrates a setting example of PUCCH resources for slot n according to a modification of the fifth embodiment.
Figure 25B:
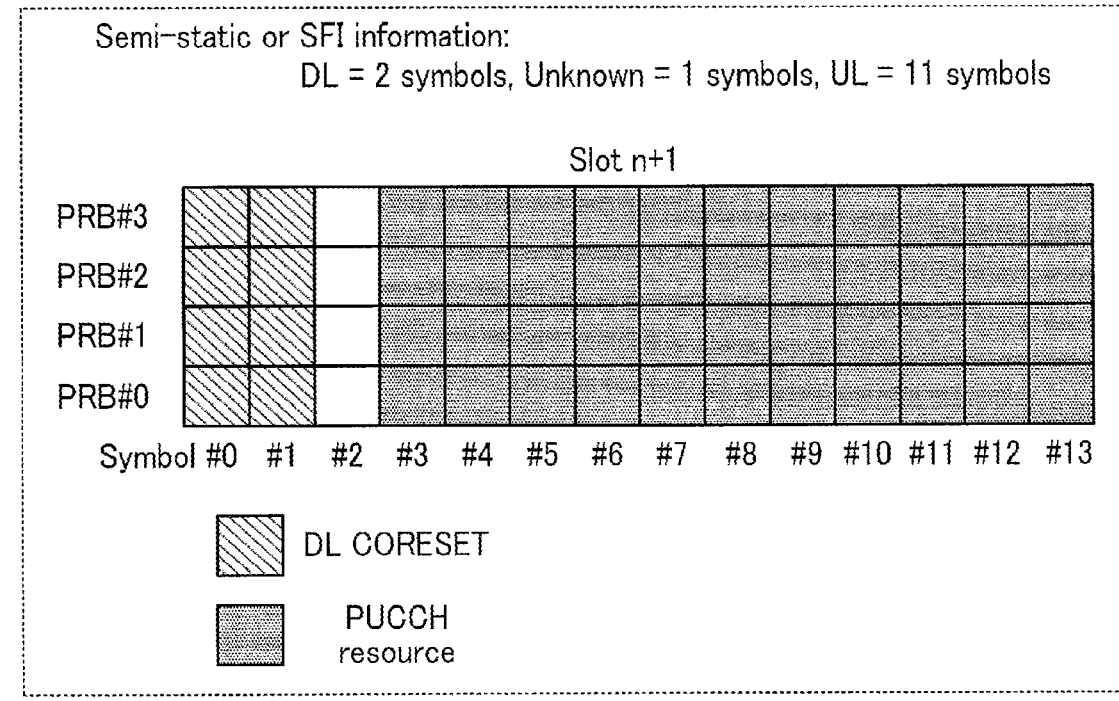
FIG. 25B illustrates a setting example of PUCCH resources for slot n+1 according to a modification of the fifth embodiment.
Figure 25C:
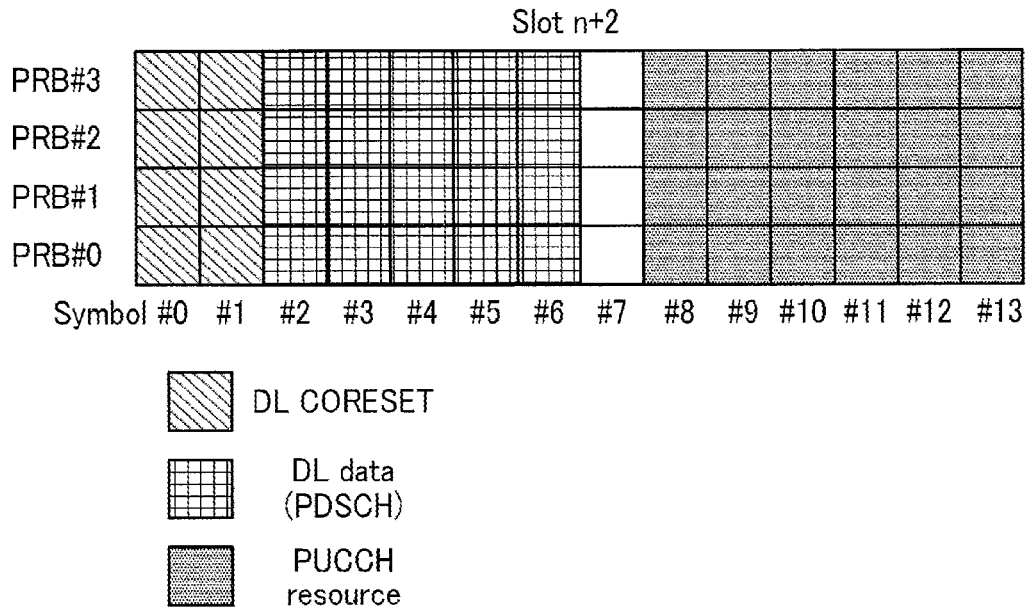
FIG. 25C illustrates a setting example of PUCCH resources for slot n+2 according to a modification of the fifth embodiment.
Figure 25D:
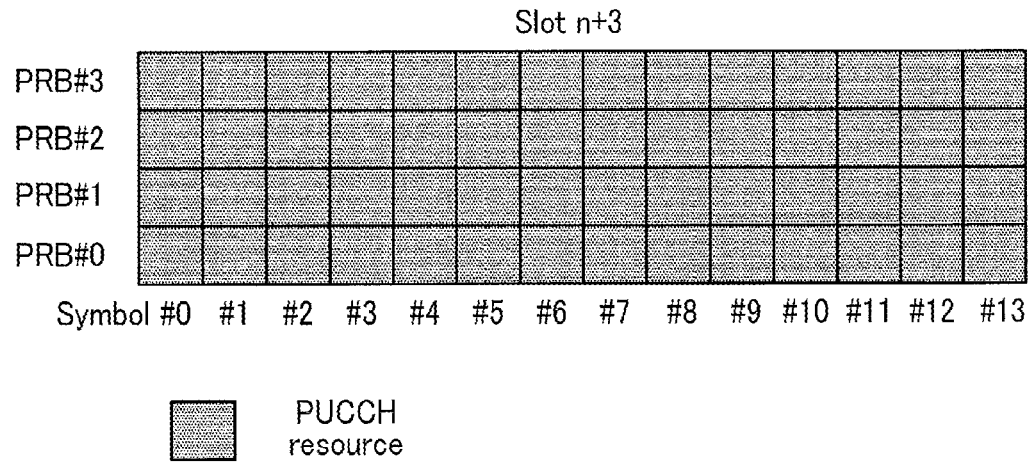
FIG. 25D illustrates a setting example of PUCCH resources for slot n+3 according to a modification of the fifth embodiment.

FIG. 24A illustrates a setting example of PUCCH resources according to the fifth embodiment, and FIG. 24B illustrates an example of the correlation between DCI bits and Semi-static resource configuration according to the fifth embodiment.

With regard to the parameter B regarding time domain resources (symbol) and parameter C regarding PUCCH transmission period, indication is made of a command "all UL symbols in slot" for implicitly deciding in FIG. 24B. Note that PUCCH resources settings are not restricted to the example illustrated in FIG. 24B, and, for example, may include combinations where specific numerical values are set for parameter B regarding time domain resources (symbol) and parameter C regarding PUCCH transmission period.

In the case of FIG. 24B, time domain resources (symbol) can be implicitly decided by the terminal 200 to be the first UL symbol in the slot obtained from the Semi-static configuration or SFI. For example, the terminal 200 is indicated by Semi-static configuration or SFI in FIG. 24A that the PUCCH resources are at symbols #8 through #13 in slot n. Accordingly, the terminal 200 decides the symbol #8 that is the first UL symbol within the slot n to be the allocated time domain resources (symbol).

Also, in the case in FIG. 24B, the terminal 200 decides the PUCCH transmission period from UL symbols within the slot obtained from the Semi-static configuration or SFI. For example, in FIG. 24A, the terminal 200 decides the six symbols of symbol #8 through #13 that are PUCCH resources within the slot n to be the allocated PUCCH transmission period (number of symbols).

Accordingly, the need for explicit indication of resources is done away with regarding part of the parameters of PUCCH resources (time domain resources (symbol) and PUCCH transmission period), so the overhead of DCI bits for PUCCH resources indication can be reduced. Alternatively, in a case where the DCI bits for PUCCH resources indication are the same (a case of a fixed value), there is no more need to take the time domain resources (symbol) and PUCCH transmission period into consideration with regard to parameter combinations, so the allocation of number of DCI bits increases for other parameters, and accordingly the other parameters can be indicated of more flexibly.

Also, in a case of not using implicit indication as in the present embodiment, the time domain resources of PUCCH are decided by UE-specific assignment. In a case where the terminal 200 has been indicated of both the Semi-static configuration or SFI, and UE-specific assignment, the base station 100 cannot control the degree of priority of the respective indications, and UE-specific assignment is always given priority. Conversely, according to the present embodiment, in a case where the terminal 200 has been indicated of both the Semi-static configuration or SFI, and UE-specific assignment, the base station 100 can control the degree of priority of multiple indications indicating slot type (Semi-static configuration/SFI and UE-specific assignment). For example, in a case of including specific numerical values (i.e., indication by UE-specific assignment) as parameters relating to time domain resources (symbol) or PUCCH transmission period (number of symbols) in DCI indicating a combination of parameters relating to PUCCH resources to be actually used, in the resource settings (Semi-static resource configuration) including multiple parameter combinations regarding PUCCH resources, the base station 100 can raise the degree of priority of UE-specific assignment. On the other hand, in a case of including the above-described commands to reference Semi-static configuration/SFI as parameters relating to time domain resources (symbol) or PUCCH transmission period (number of symbols) in DCI indicating a combination of parameters relating to PUCCH resources to be actually used, in the resource settings (Semi-static resource configuration) including multiple parameter combinations regarding PUCCH resources (i.e., Implicit notification), the base station 100 can raise the degree of priority of Semi-static configuration/SFI indication.

Modification of Fifth Embodiment

Description has been made in the fifth embodiment regarding a case where PUCCH is transmitted by single slot (e.g., see FIG. 24A). However, PUCCH can be transmitted using multiple slots in NR. In a case of transmitting PUCCH using multiple slots, there are cases where the slot types (number of UL symbols within slots) differ among the multiple slots transmitting PUCCH.

Accordingly, a case of transmitting PUCCH using multiple slots will be described in a modification of the fifth embodiment.

Specifically, in a case where Semi-static configuration or SFI can be used, the terminal 200 transmits PUCCH using uplink symbols indicated by the uplink symbol obtained from Semi-static configuration or SFI for the time domain resources (symbol) and PUCCH transmission period, in the same way as in the fifth embodiment.

On the other hand, in a case where Semi-static configuration or SFI cannot be used, the terminal 200 transmits PUCCH using uplink symbols indicated by UE-specific assignment (e.g., the time domain resources (symbol) and PUCCH transmission period decided by the combination of parameters regarding PUCCH resources).

A case is also conceivable where the number of uplink symbols obtained by Semi-static configuration or uplink symbols indicated by SFI is smaller than four symbols. It is conceivable in NR that only Long PUCCH is capable of PUCCH transmission using multiple slots. Accordingly, in a case where the number of uplink symbols obtained by Semi-static configuration or UL symbols indicated by SFI is smaller than four symbols, the terminal 200 may drop or postpone transmission of PUCCH.

FIG. 25A through FIG. 25D illustrates setting examples of PUCCH resources in slot n through slot n+3 according to a modification of the fifth embodiment. That is to say, FIG. 25A through FIG. 25D illustrate a case of the terminal 200 transmitting PUCCH using four slots.

The terminal 200 decides PUCCH resources allocated to the terminal 200 for each slot, based on UL symbols (symbol position and number of symbols) indicated by Semi-static configuration or SFI regarding each slot as in FIG. 24A, as illustrated in FIG. 25A through FIG. 25D. Accordingly, even if the slot type (number of UL symbols within the slot) differs among the multiple slots transmitting PUCCH as illustrated in FIG. 25A through FIG. 25D, the terminal 200 can identify the PUCCH resources allocated to each slot.

In a case of allocating PUCCH resources for each slot in PUCCH transmission using multiple slots, overhead of resource allocation increases. Conversely, according to the modification of the fifth embodiment, the terminal 200 can decide PUCCH resources for each slot by Semi-static configuration or SFI, so overhead for resource allocation can be reduced. Also, even in a case of transmitting PUCCH using slots with different number of UL symbols in the slots, the terminal 200 can use the UL symbols without waste, so resource usage efficiency can be improved.

Sixth Embodiment

The base station and terminal according to the present embodiment have the basic configuration in common with the base station 100 and terminal 200 according to the first embodiment, so description will be made with reference to FIG. 7 and FIG. 8.

In the first embodiment, description has been made, with regard to allocation of PUCCH resources for transmitting uplink control signals (e.g., ACK/NACK signals), regarding a method where the base station indicates the terminal of resource settings (Semi-static resource configuration) including multiple parameter combinations regarding PUCCH resources by higher layer signals, and one combination of parameters regarding PUCCH resources to be actually used is selected by several bits of the DCI of the PDCCH to which the corresponding downlink data has been allocated. Description has also been made in the first embodiment that parameters regarding PUCCH resources can include time domain resources (slot) and time domain resources (symbol position).

On the other hand, overhead of DCI bits for PUCCH resources indication can be reduced by doing away with explicit indication of resources for part of the parameters of PUCCH resources, as described in the fifth embodiment. Alternatively, in a case where the DCI bits are the same (a case of a fixed value), there is no need to take part of the parameters into consideration, so the other parameters can be indicated of more flexibly.

In the present embodiment, a method of adding a function of implicit indication is described regarding part of the parameters of PUCCH resources.

The base station 100 indicates the terminal 200 of resource settings (Semi-static resource configuration) including multiple parameter combinations regarding PUCCH resources by higher layer signals, and selects one combination of parameters regarding PUCCH resources to be actually used by several bits of the DCI of the PDCCH to which the corresponding downlink data has been allocated. The present embodiment has, at this time, a function of implicit indication regarding one or multiple parameters of the resource settings (Semi-static resource configuration) including multiple parameter combinations regarding PUCCH resources.

For example, information relating to frequency resources or information relating to code resources (cyclic shift or time domain orthogonal code (Orthogonal Cover Code (OCC)) are conceivable of parameters regarding which an implicit indication function is added. Note that parameters regarding which an implicit indication function is added are not restricted to these.

As for a function of implicit notification, there is a method of adding additional offset to a parameter indicated by DCI. Examples of additional offset that can be used include C-RNTI mod X, CCE mod X, and so forth, based on the identifier (C-RNTI: Cell-Radio Network Temporary Identifier) of the terminal 200 or CCE (Control Channel Element) used regarding the terminal 200. Also, PDSCH resources may be used instead of CCE. The value of X may be a fixed value, or a value set by RRC signals.

Figure 26:
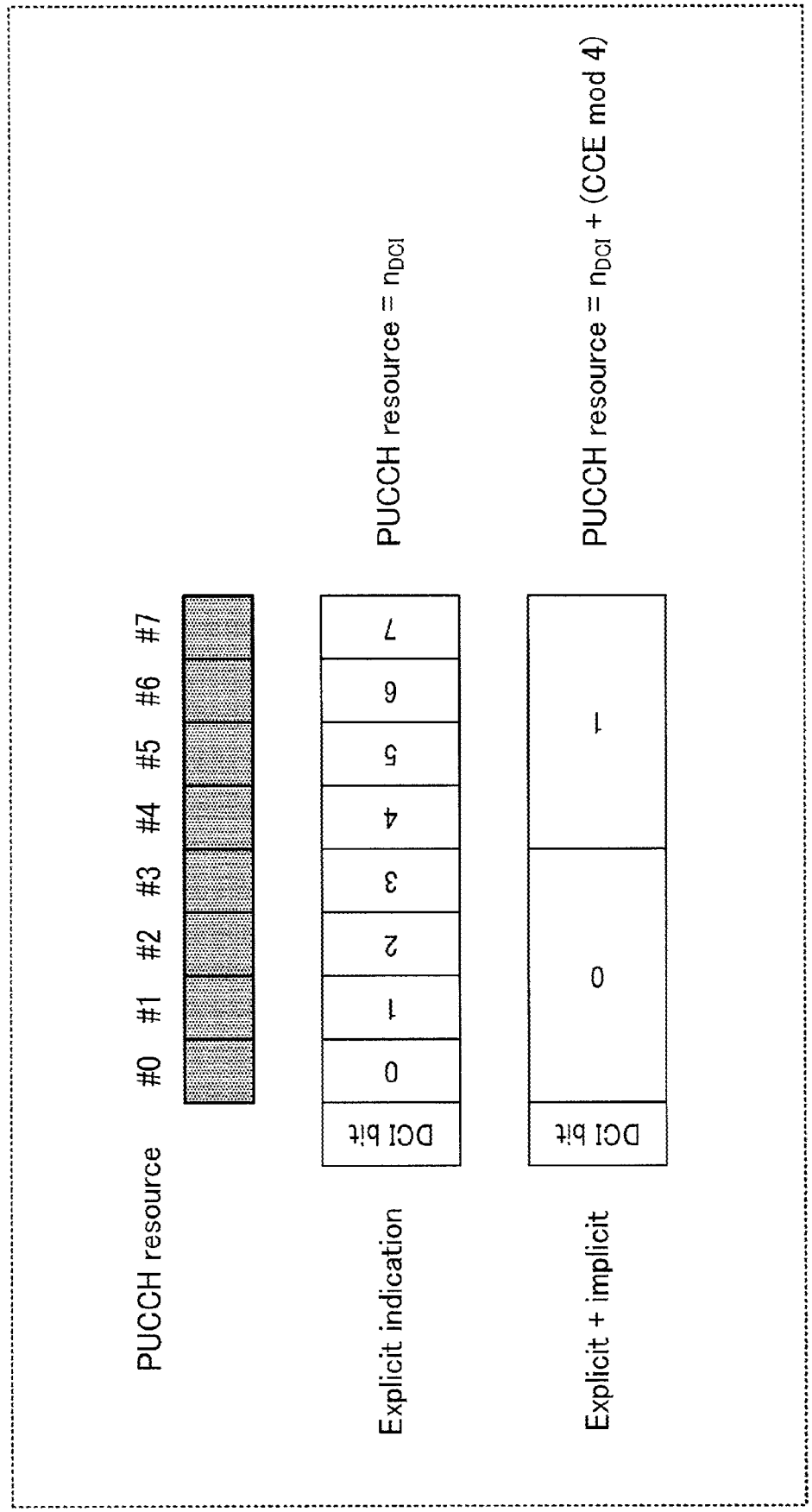
FIG. 26 illustrates a setting example of PUCCH resources according to a sixth embodiment.

FIG. 26 illustrates an example of PUCCH resources settings in the present embodiment. Allocation of PUCCH resources #0 through #7 will be described in FIG. 26. For example, in a case of Explicit indication alone (Explicit indication), there is a need to make indication of eight PUCCH resources #0 through #7 by 3-bit DCI.

As opposite to this, in the present embodiment (Explicit+Implicit), the base station 100 makes indication of eight PUCCH by one bit, for example, and can avoid collision of PUCCH resources among terminals 200 by Implicit notification (e.g., additional offset).

For example, the base station 100 groups the eight PUCCH resources #0 through #7 (candidate values) into PUCCH resources #0 through #3 and PUCCH resources #4 through #7 in FIG. 26, and explicitly indicates the terminal of any one ($n_{DCI}$) of the multiple (two) groups using 1-bit DCI. The terminal 200 then adds additional offset (CCE mod 4) to the $n_{DCI}$ indicated by the 1-bit DCI, and implicitly decides PUCCH resources. Accordingly, the base station 100 can allocate PUCCH resources for each of the PUCCH resources #0 through #7 while avoiding collision of PUCCH resources among the terminals 200.

Thus, according to the present embodiment, the terminal 200 is indicated of at least one parameter of multiple parameters regarding PUCCH resources by DCI (Explicit notification) indicating any one of multiple groups where multiple candidate values of the parameter have been grouped, and offset (Implicit notification) set to each terminal 200.

Accordingly, there is no more need, or less need, for explicit indication of resources by DCI regarding part of the parameters of PUCCH resources, so the overhead of DCI bits for PUCCH resource indication can be reduced. Alternatively, in a case where the number of DCI bits is the same (a case of a fixed value), there is no need to take part of the parameters into consideration regarding parameter combinations, or the number of bits for indication is reduced, so allocation of number of DCI bits increases for other parameters, and the other parameters can be indicated of more flexibly.

Embodiments of the present disclosure have been described above.

The present disclosure can be realized by software, hardware, or software in cooperation with hardware. The functional blocks such as used in the above-described embodiments typically are partly or fully realized as LSI that is an integrated circuit, and the processes described in the above embodiments may be partially or entirely controlled by one LSI or a combination of LSIs. These LSIs may be individually formed into one chip, or part or all of the functional blocks may be included in one chip. LSIs may have data input and output. There are different names of LSIs such as IC, system LSI, super LSI, and ultra LSI, depending on the degree of integration. The circuit integration technique is not restricted to LSIs, and dedicated circuits, general-purpose processors, or dedicated processors may be used to realize the same. An FPGA (Field Programmable Gate Array) which can be programmed after manufacturing the LSI, or a reconfigurable processor where circuit cell connections and settings within the LSI can be reconfigured, may be used. The present disclosure may be realized by digital processing or analog processing. Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

A base station according to the present disclosure includes: a circuit that selects, from a plurality of combinations of parameters regarding uplink control channel (PUCCH) resources, one combination; and a transmitter that indicates a terminal of resource settings including the plurality of combinations by higher layer signaling, and indicates the terminal of the one combination that has been selected by dynamic signaling.

In the base station according to the present disclosure, the plurality of parameters include a parameter indicating frequency domain resources, a parameter indicating a slot, a parameter indicating a symbol position within the slot, and a parameter indicating the number of symbol.

In the base station according to the present disclosure, the frequency domain resources are represented by an offset value indicating a start position from an edge of a band, the number of consecutive resource blocks, the number of clusters, and an inter-cluster distance.

In the base station according to the present disclosure, the offset value indicates a start position from an edge of the band that the termination supports within a system band, and a range of the offset value is a range of bandwidth of the band that the termination supports within the system band.

In the base station according to the present disclosure, the range of the offset value is a range of half the band.

In the base station according to the present disclosure, in a case where the number of symbols of the PUCCH resources is a threshold value or greater, the source block count is 1.

In the base station according to the present disclosure, the number of consecutive resource blocks is associated with the PUCCH format.

In the base station according to the present disclosure, in a case where the number of symbols of the PUCCH resources is a threshold value or greater, the cluster count is 1.

In the base station according to the present disclosure, the inter-cluster distance is identified from the bandwidth of the band and the number of consecutive resource blocks.

In the base station according to the present disclosure, the number of consecutive resource blocks and the inter-cluster distance are powers of 2.

In the base station according to the present disclosure, in a case where a plurality of different subcarrier spacings are set in a same band, the number of consecutive resource blocks and the inter-cluster distance in a first subcarrier spacing are each identified from the number of consecutive resource blocks and the inter-cluster distance in a second subcarrier spacing.

In the base station according to the present disclosure, the parameter that indicates the inter-cluster distance in a case where the number of symbols of the PUCCH resources is smaller than a threshold value, indicates a frequency hopping distance in a case where the number of symbols of the PUCCH resources is the threshold value or greater.

In the base station according to the present disclosure, a range of the parameter indicating the symbol position within the slot differs between a case where the number of symbols of the PUCCH resources is smaller than a threshold value, and in a case where the number of symbols of the PUCCH resources is the threshold value or greater.

In the base station according to the present disclosure, a range of the parameter indicating the symbol position within the slot, and the parameter indicating the number of symbols of the PUCCH resources, are associated.

In the base station according to the present disclosure, a plurality of uplink control resource sets are associated with the resource settings that are different from each other.

In the base station according to the present disclosure, the plurality of parameters included in the resource settings are configured based on one control resource set associated with the PUCCH format, out of the plurality of control resource sets.

In the base station according to the present disclosure, a resource amount of the control resource set is indicated to the terminal from the base station by Group common PDCCH, and the different resource settings are each associated with the resource amount indicated by the Group common PDCCH.

In the base station according to the present disclosure, one of a first transmission method that is in slot based, and a second transmission method that is in non-slot based, is set. In a case where the first transmission method is set, at least a parameter indicating a symbol position is included in the plurality of parameters, and the transmitter indicates the terminal of a parameter indicating a slot, independently from the resource settings. In a case where the second transmission method is set, at least the parameter indicating the slot and a parameter indicating a symbol position within the slot, are included in the plurality of parameters.

In the base station according to the present disclosure, a numerical value indicating a symbol position within a slot or the number of symbols is not included in the resource settings, and a numerical value indicating the symbol position or the number of symbols is indicated to the terminal by information indicating a type of the slot.

In the base station according to the present disclosure, the terminal is indicated of at least one parameter of the plurality of parameters by the dynamic signaling indicating one of a plurality of groups where a plurality of candidate values of the parameter have been grouped, and offset set for each terminal.

A terminal according to the present disclosure includes: a receiver that receives higher layer signaling including resource settings indicating a plurality of combinations of parameters regarding uplink control channel (PUCCH) resources, and receives dynamic signaling indicating one combination out of the plurality of combinations; and a transmitter that transmits uplink control signals by the PUCCH resources represented by the plurality of parameters corresponding to the one combination indicated by the dynamic signaling, out of the plurality of combinations.

A communication method according to the present disclosure includes: selecting, from a plurality of combinations of parameters regarding uplink control channel (PUCCH) resources, one combination; and indicating a terminal of resource settings including the plurality of combinations by higher layer signaling, and indicating the terminal of the one combination that has been selected by dynamic signaling.

A communication method according to the present disclosure includes: receiving higher layer signaling including resource settings including a plurality of combinations of parameters regarding uplink control channel (PUCCH) resources, and receiving dynamic signaling indicating one combination out of the plurality of combinations; and transmitting uplink control signals by the PUCCH resources represented by the plurality of parameters corresponding to the one combination indicated by the dynamic signaling, out of the plurality of combinations.

An embodiment of the present disclosure is useful in a mobile communication system.

REFERENCE SIGNS LIST 100 base station
101, 209 control unit
102 data generating unit
103, 107, 110, 211, 214 encoding unit
104 retransmission control unit
105, 108, 111, 212, 215 modulating unit
106 higher layer control signal generating unit
109 downlink control signal generating unit
112, 217 signal allocation unit
113, 218 IFFT unit
114, 219 transmission unit
115, 201 antenna
116, 202 reception unit
117, 203 FFT unit
118, 204 extracting unit
119 CSI demodulating unit
120 SRS measuring unit
121 modulating/demodulating unit
122 determining unit
200 terminal
205 downlink control signal demodulating unit
206 higher layer control signal demodulating unit
207 downlink data signal demodulating unit
208 error detecting unit
210 CSI generating unit
213 ACK/NACK generating unit
216 SRS generating unit

The invention claimed is:

1. A terminal comprising:
a receiver, which, in operation, receives information indicating a set of parameters related to a physical uplink control channel (PUCCH) resource; and
a transmitter, which, in operation, transmits uplink control information using the PUCCH resource determined based on the information,
wherein a starting symbol and a number of symbol(s) for a given PUCCH format are variable by the set of parameters while a number of resource block(s) for the given PUCCH format is fixed according to the given PUCCH format.

2. The terminal according to claim 1, wherein the set of parameters includes a starting resource block.

3. The terminal according to claim 2, wherein the starting resource block is represented as an offset from an edge of a bandwidth.

4. The terminal according to claim 3, wherein the offset is in a range of a bandwidth that the terminal supports in a system bandwidth.

5. The terminal according to claim 1, wherein a plurality of sets, each set including parameters related to the PUCCH resource, are configured to the terminal, and the information indicates one set of the plurality of sets.

6. The terminal according to claim 5, wherein the plurality of sets are semi-statically configured by a higher layer, and the information is received in a downlink control information.

7. The terminal according to claim 5, wherein the information is dedicated to the terminal.

8. The terminal according to claim 1, wherein the receiver, in operation, receives a downlink control information, and the transmitter, in operation, transmits the uplink control information using the PUCCH resource that is based on the information and that is associated with a resource used for transmission of the downlink control information.

9. The terminal according to claim 8, wherein the information is specific to a cell or a group of terminals.

10. The terminal according to claim 1, wherein the receiver, in operation, receives a downlink control information related to a symbol available for uplink, and the transmitter, in operation, transmits the uplink control information using the symbol available for uplink in the PUCCH resource determined based on the information.

11. The terminal according to claim 10, wherein when the PUCCH resource determined based on the information is not the symbol available for uplink, the uplink control information is not transmitted.

12. The terminal according to claim 10, wherein the uplink control information is a periodically transmitted signal.

13. A communication method comprising:
receiving information indicating a set of parameters related to a physical uplink control channel (PUCCH) resource; and
transmitting uplink control information using the PUCCH resource determined based on the information,
wherein a starting symbol and a number of symbol(s) for a given PUCCH format are variable by the set of parameters while a number of resource block(s) for the given PUCCH format is fixed according to the given PUCCH format.

* * * * *